United States Patent [19]
Robert

[11] Patent Number: 5,214,751
[45] Date of Patent: May 25, 1993

[54] METHOD FOR THE TEMPORAL INTERPOLATION OF IMAGES AND DEVICE FOR IMPLEMENTING THIS METHOD

[75] Inventor: Philippe Robert, Rennes, France

[73] Assignee: Thomson Grand Public, Paris, France

[21] Appl. No.: 798,996

[22] PCT Filed: May 31, 1988

[86] PCT No.: PCT/FR88/00271
§ 371 Date: Feb. 1, 1989
§ 102(e) Date: Feb. 1, 1989

[87] PCT Pub. No.: WO88/10046
PCT Pub. Date: Dec. 15, 1988

Related U.S. Application Data
[63] Continuation of Ser. No. 327,805, Feb. 1, 1989, abandoned.

[30] Foreign Application Priority Data
Jun. 4, 1987 [FR] France .................. 87 07814

[51] Int. Cl.$^5$ .......................... G06F 15/626
[52] U.S. Cl. ..................... 395/129; 395/118; 340/728
[58] Field of Search ............ 340/728, 747, 750; 395/118, 129, 162, 164

[56] References Cited
FOREIGN PATENT DOCUMENTS
2110046  6/1983  United Kingdom .
2162018  1/1986  United Kingdom .
2165417  4/1986  United Kingdom .

Primary Examiner—Phu K. Nguyen
Attorney, Agent, or Firm—Cushman, Darby & Cushman

[57] ABSTRACT

A method enabling reconstitution of the luminance values of a frame from the luminance values of the pixels of two known frames. The method includes estimating a velocity vector for each pixel of a single frame corresponding with an instant $T_1$ between $T_a$ and $T_b$, or being $T_a$ or $T_b$. For each pixel of this image, called the father pixel, the coordinates of the center of a pixel to be interpolated, called the son pixel, are successively determined, corresponding with the center of the father pixel by a translation whose vector is a function of the velocity vector of the father pixel, multiplied by the duration $T_1 - T_j$. Each pixel to be interpolated has successively associated therewith a velocity vector which is constituted by the velocity vector of its father pixel, and in the two known frames, the coordinates and then the luminance of two points corresponding with the center of the pixel to be interpolated are determined, by a translation in the plane of one of the known images. The vector of this translation is a function of the velocity vector associated with the pixel to be interpolated, respectively multiplied by the durations $T_j - T_a$ and $T_b - T_j$. Then, a luminance value for the pixel to be interpolated is determined by computing a linear combination of the luminance values of these two points.

13 Claims, 15 Drawing Sheets

METHOD FOR THE TEMPORAL INTERPOLATION OF IMAGES AND DEVICE FOR IMPLEMENTING THIS METHOD

This is a continuation of application Ser. No. 07/327,805, filed on Feb. 1, 1989, which was abandoned upon the filing hereof.

BACKGROUND OF THE INVENTION

The invention relates to a method for the temporal interpolation of images enabling the reconstitution of the luminance values of the pixels of a missing image in a series of images representing the same object. Such a method is used, for example, for a transmission of video images at a very low rate, consisting in transmitting only certain frames, with a coding reducing the data rate, and in restoring the frames not transmitted by interpolation from the transmitted and decoded frames. It can also be used for the conversion of a series of video images using a standard having a frequency of 50 Hz to a standard having a frequency of 60 Hz, or vice-versa. For such a conversion, most of the frames must be interpolated from frames available at the frequency of 50 Hz, as the instants of shooting at the frequency of 60 Hz do not coincide with the instants of shooting at the frequency of 50 Hz.

The object of the interpolation is therefore to determine a luminance value $L(IX,IY,T_j)$ for each pixel of a frame to be interpolated corresponding to an instant $T_j$ from the luminance values $L(IX,IY,T_a)$ and $L(IX,IY,T_b)$ of the pixels of two known frames corresponding to instants $T_a$ and $T_b$ such that $T_j$ occurs between $T_a$ and $T_b$. The pixels of the frames are referenced by the coordinates (IX,IY) of their centers in an ortho-normed reference system which is common to all the frames.

A first category of temporal interpolation methods is based on a simple linear interpolation consisting in computing, for each pixel to be interpolated, a linear combination of two luminance values of pixels having homologous coordinates (IX,IY) in the two known frames corresponding to the instants $T_a$ and $T_b$, weighted by the durations $T_b - T_j$ and $T_j - T_a$, according to the formula:

$$L(IX, IY, T_j) = \frac{T_b - T_j}{T_b - T_a} \cdot L(IX, IY, T_a) + \frac{T_j - T_a}{T_b - T_a} \cdot L(IX, IY, T_b) \quad (1)$$

The homologous coordinates are exactly identical if the two frames $T_a$ and $T_b$ have the same parity and are identical to within half a line if they have different parities.

This category of methods enables a good restitution of fixed zones in a series of frames as in this case the luminance values used for the interpolation actually correspond to a same point of the object represented by the series of frames. On the other hand, zones in motion are poorly restored and become more blurred as the speed of motion increases.

A second category of methods takes account of the motion of the object represented by the two known frames. These methods consist in assuming that each point of an object in motion represented by the series of frames displaces from the first known frame to the second known frame by means of an elementary translation at constant velocity. Known methods enable the determination of a velocity vector $\bar{V}=(VX,VY)$ for each pixel of the frame to be interpolated. This vector represents an elementary translation of the pixel, which does not necessarily correspond to the velocity of the represented object but corresponds to the variations in the luminance of the pixels representing that object.

These methods of the second category then consist in computing an interpolated value of luminance for each pixel, taking account of two displacements in opposite senses respectively in the two known frames. These two displacements are in the direction of the velocity vector associated with the pixel to be interpolated and respectively have a modulus proportional to the time interval separating the frame to be interpolated and the known frame concerned. Each interpolated luminance value is therefore computed according to the formula:

$$L(IX, IY, T_j) = \frac{T_b - T_j}{T_b - T_a} \cdot L(IX - VX \cdot (T_j - T_a), IY - VY \cdot (T_j - T_a), T_a) + \frac{T_j - T_a}{T_b - T_a} \cdot L(IX + VX \cdot (T_b - T_j), IY + VY \cdot (T_b - T_j), T_b) \quad (2)$$

This category of methods enables a more precise restitution of the zones in motion as well as of the fixed zones of the frames to be interpolated. But the implementation of this category of methods includes a major difficulty which is the determination of a velocity vector to be associated with each pixel to be interpolated. A first known method, described by H. C. Bergman in "Motion Adaptive Frame Interpolation 1984 International Zurich Seminar on Digital Communications", consists in associating with each pixel to be interpolated the estimated velocity vector for the pixel having the same coordinates in the first known frame. This association is always more or less inaccurate since in the zones in motion these two pixels do not represent a same point of the object in motion. This association is only exact insofar as adjacent points of the object in motion have the same velocity vector, which is not necessarily the case, particularly if the represented object is undergoing a rotation. The fidelity of restitution of images therefore varies, in the zones in motion, depending on the type of motion in these zones.

A second known method, described by M. Bierling and R Thoma in "Motion compensating field interpolation using a hierarchically structured displacement estimator" consists in estimating a velocity vector for each pixel of each frame to be interpolated, independently for each frame to be interpolated. This estimation is made from the same pair of known images, for all the frames to be interpolated corresponding to instants between $T_a$ and $T_b$, but it takes account of the duration of the time intervals separating the frame to be interpolated and the known images and, consequently, the velocity vector associated with each pixel to be interpolated has a much more accurate value than that associated by means of the previously described method. The fidelity of restitution of the frames in the zones in motion is therefore made independent of the type of motion. On the other hand, this second method has the disadvantage of multiplying the computing time necessary for the estimation of the velocity vectors, since it is proportional to the number of frames to be interpolated between the two known frames.

SUMMARY OF THE INVENTION

The purpose of the invention is to propose a method of temporal interpolation providing a good fidelity of restitution of frames in the zones in motion, whatever the type of motion may be, without necessitating a long computation time for the estimation of the velocity vectors of the pixels of the frames to be interpolated.

The subject of the invention is a method belonging to the second category which essentially consists in estimating a velocity vector for each pixel of a single frame which is called the motion carrier frame, which can be one of the two known frames, and then in determining, in each of the frames to be interpolated, the pixels called son pixels which have a velocity vector equal to the velocity vector of a pixel called the father pixel corresponding to a same point of the object represented by the series of frames, this point being assumed to move with the same velocity vector during the time interval from $T_a$ to $T_b$.

Naturally, the method according to the invention is also applicable to images which are not interlaced frames.

According to the invention, a method for the temporal interpolation of images, for determining an interpolated luminance value for each pixel of an image called the image to be interpolated, from luminance values of pixels of a first image and of a second image called known images, taken at instants $T_a$ and $T_b$ respectively, $T_j$ being between $T_a$ and $T_b$, consists in:

estimating, using a conventional method, the components of a velocity vector for each pixel of a single image, called the motion carrier, corresponding to an instant $T_i$ between $T_a$ and $T_b$, or being $T_a$ or $T_b$;

determining, successively for each pixel of the carrier image, called the father pixel, the coordinates of the center of a pixel to be interpolated, called the son pixel, corresponding to the center of the father pixel by a translation whose vector is a function of the velocity vector of the father pixel, multiplied by the duration $T_i - T_j$;

associating, successively with each pixel to be interpolated, a velocity vector constituted by the velocity vector of its father pixel or of one of its father pixels if there is at least one father pixel for this pixel to be interpolated;

determining in the two known images the coordinates of two points called base points of the temporal interpolation, each of these two points corresponding to the center of the pixel to be interpolated, by a translation in the plane of one of the known images, the vector of this translation being a function of the velocity vector associated with the pixel to be interpolated, respectively multiplied by the durations $T_j - T_a$ and $T_b - T_j$;

determining the luminance value of each of the two base points by means of a spatial interpolation between the pixels adjacent to each of these base points, respectively in the two known images;

determining a luminance value for the pixel to be interpolated by computing a linear combination of the two luminance values of the base points, weighted by the durations $T_j - T_a$ and $T_b - T_j$ respectively.

DESCRIPTION OF THE PREFERRED EMBODIMENTS

Figure 1:
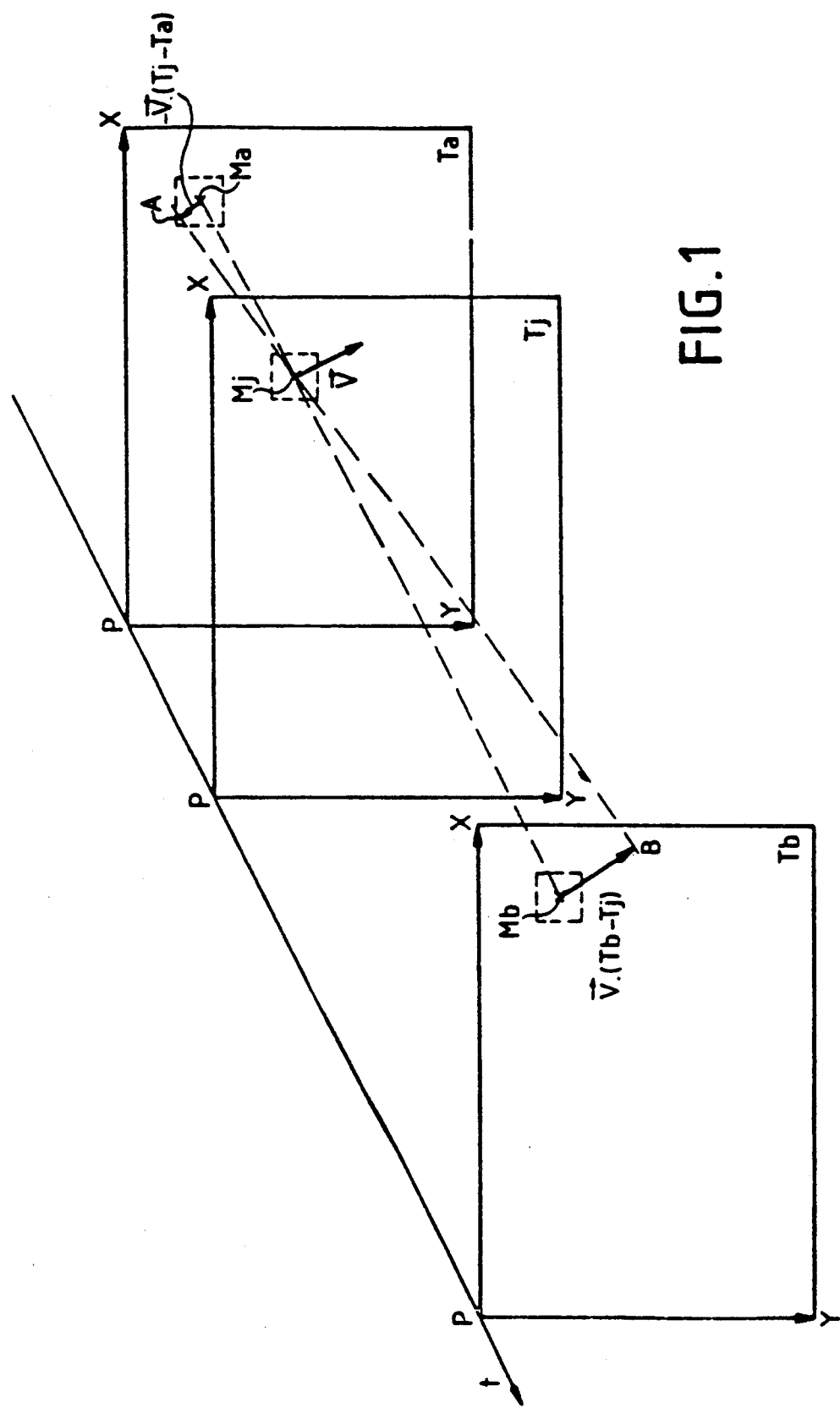
FIG. 1 shows the principle of the second category of known methods.

In the example shown in FIG. 1, a frame to be interpolated, called frame $T_j$ since it corresponds to an instant $T_j$, is to be interpolated from a first known frame and a second known frame respectively called frame $T_a$ and frame $T_b$ since they correspond to an instant $T_a$ which precedes $T_j$ and to an instant $T_b$ which follows $T_j$. All of these frames are referenced using the same ortho-normed reference system PXY having units equal to the size of one pixel. Points having identical coordinates (X,Y) are differentiated by the instants corresponding to the frames in which these points are located. In the following text the points and the pixels will be distinguished, each frame point has infinitely small dimensions while each pixel has finite dimensions determined by the sampling characteristics. The known frames are supplied by a source of video signals such as a conventional television camera followed by a conventional analog-digital converter. Each pixel is referenced by the coordinates of its center and it is represented by a dotted square. Each has a luminance value equal to the average of the luminances of all of the points contained within this pixel. By hypothesis, each pixel to be interpolated, centered on a point $M_j$ in the frame to be interpolated $T_j$, has an associated velocity vector $\vec{V}$. There therefore exist, in the known frames $T_a$ and $T_b$, two points $M_a$ and $M_b$ having coordinates homologous with those of $M_j$ and each of which is the center of a pixel represented by a dotted square.

The first category of known methods consists in computing the luminance value of the pixel to be interpolated by linearly combining the luminance values of the pixels centered on $M_b$ and $M_b$. There is an error due to the fact that in the frame $T_b$ the represented object is displaced with respect to the frame $T_j$, in the direction and sense of the vector $\vec{V}$, while on the other hand, in the frame $T_a$, the represented object is displaced in the direction of and in the opposite sense of the vector $\vec{V}$. The second category of known methods consists in computing a luminance value interpolated from the luminance values of a point B in the frame $T_b$ and of a point A in the frame $T_a$, determined taking account of a translation of the object in the frames $T_a$ and $T_b$ with respect to the frame $T_j$. The point A is derived from $M_a$ by a translation $\vec{V} \cdot (T_j - T_a)$ and the point B is derived from $M_b$ by a translation: $\vec{V} \cdot (T_b - T_j)$, since any point of an object represented by the series of frames is assumed to maintain a constant velocity between the instants $T_a$ and $T_b$. In the following text, the points A and B are called base points of the temporal interpolation. The method according to the invention is based on the same hypothesis.

Figure 2:
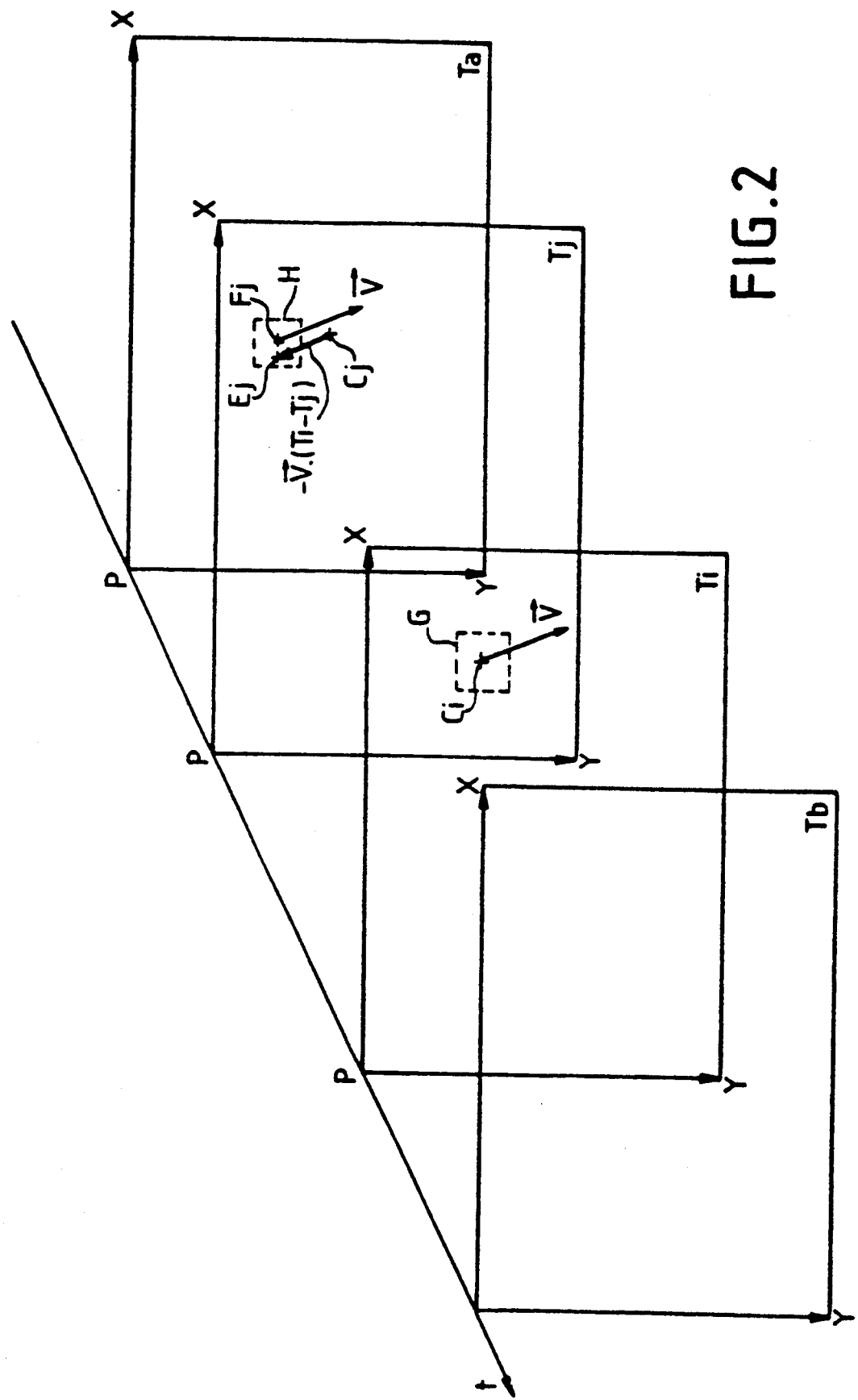
FIG. 2 shows the method according to the invention.

FIG. 2 illustrates the step in the method according to the invention consisting in associating a velocity vector $\vec{V}$ with a pixel to be interpolated, centered on a point $F_j$ in the frame to be interpolated $T_j$.

In this example, there is only one single frame $T_j$ to be interpolated, but in other cases there can be several frames to be interpolated, corresponding to instants between $T_a$ and $T_b$. For all of the frames to be interpolated between $T_a$ and $T_b$, the associated velocity vectors are derived from the velocity vectors of the pixels of a single frame $T_i$, called the motion carrier frame, corresponding to an instant between $T_a$ and $T_b$ or able to be $T_a$ or $T_b$. The computations necessary for determining the velocity vectors of the pixels of the carrier frame are carried out just once no matter how many frames there are to be interpolated between the instants $T_a$ and $T_b$.

Each pixel of the motion carrier frame $T_i$ is considered as the father of a single pixel, called the son pixel, in the frame to be interpolated $T_j$, these two pixels being assumed to represent the same point of the object in motion. This point of the object in motion has a velocity vector which is known in the frame $T_i$. This point is assumed to maintain this same velocity vector at all the instants between $T_a$ and $T_b$ even though it is represented by a series of pixels having different coordinates and which are all sons of a same father pixel in the frame $T_i$. The method according to the invention consists in determining, in each frame to interpolated $T_j$, the center of a son pixel corresponding to a given father pixel in the motion carrier frame $T_i$ and then in allocating to this son pixel a velocity vector equal to the velocity vector of its father pixel, or of one of its father pixels.

For example, in FIG. 2, a pixel G centered on the point $C_i$ in the frame $T_i$ has a known vector $\vec{V}$ as its velocity vector. It has a son pixel H in the frame $T_j$ which approximately corresponds to it by a vector translation $-\vec{V} \cdot (T_i - T_j)$ from a point $C_j$ having, in the frame $T_j$, coordinates which are homologous with those of the point $C_i$ in the frame $T_i$. This translation makes a point $E_j$ correspond exactly with the point $C_j$. The point $E_j$ does not generally coincide with the center of a pixel. The method then consists in taking as a son pixel the pixel in the frame $T_j$ having a center $F_j$ closest to the point $E_j$, by taking the closest integer value for each of the coordinates. The velocity vector $\vec{V}$ of the father pixel G is then associated with this son pixel H.

It should be noted that certain pixels in the motion carrier frame $T_i$ do not have son pixels, for example the pixels located at the edge of the carrier frame do not have son pixels when the velocity vector $\vec{V}$ is directed towards the inside of the carrier frame. It should also be noted that a pixel in the frame to be interpolated $T_j$ can be the son pixel of several father pixels simultaneously. For example, if two father pixels respectively have two non-colinear velocity vectors, it can arise that the two translation vectors $\overrightarrow{C_jE_j}$ corresponding to these velocity vectors converge into a same son pixel. These particular cases are processed differently according to three variant implementations of the method according to the invention which will be described later.

In a particular case, the carrier frame $T_i$ considered is the frame $T_a$ or the frame $T_b$. If for example the carrier frame considered is the frame $T_b$, the estimation of the velocity vectors of its pixels can consist in computing, using a known method, the elementary translation undergone for each point of the object between the frame $T_a$ and the frame $T_b$, by deriving an elementary translation vector (DX,DY) for each pixel of the frame $T_b$ and then computing a velocity vector $\vec{V}$ for each of these pixels according to the formula:

$$(VX, VY) = \left( \frac{DX}{T_b - T_a}, \frac{DY}{T_b - T_a} \right) \quad (3)$$

Figure 3:
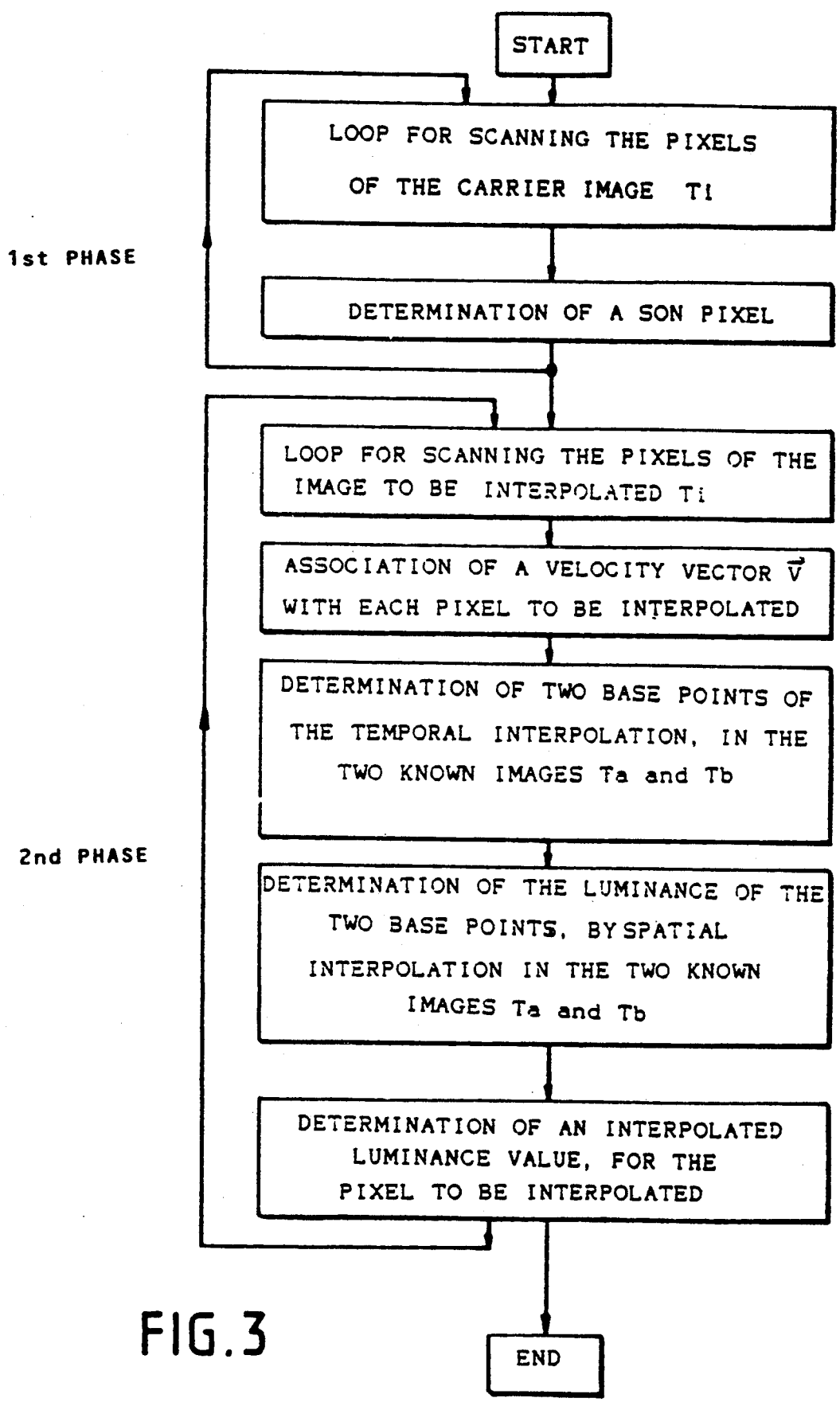
FIG. 3 is a flowchart illustrating the method according to the invention.

FIG. 3 shows a flowchart of the essential steps of the method according to the invention, no matter what variant implementation is considered. This flowchart represents the steps of the temporal interpolation method of a single frame to be interpolated, corresponding to an instant $T_j$. The same steps must be carried out for each frame to be interpolated and also contained inside the interval $(T_a, T_b)$. FIG. 3 does not mention the step in which the velocity vectors of the pixels of the carrier frame $T_i$ are determined since this is a step which is performed just once for all of the frames to be interpolated between the two known frames corresponding to the instants $T_a$ and $T_b$. The frame for which the estimation of the velocity vectors is carried out can be the frame $T_a$ or the frame $T_b$ or a frame whose luminance values are unknown but which corresponds to an instant $T_i$ between $T_a$ and $T_b$. For example it can be constituted by one of the frames to be interpolated, the essential feature being the use of a method for the estimation of velocity which enables the obtaining of an exact value of the components of the velocity vector for each pixel of that frame. Numerous velocity estimation methods can be used. Those which perform the determination in blocks of pixels or pixel by pixel are more suitable than those which perform the determination by extraction of the characteristics of the frame because they enable a denser field of velocity vectors to be obtained and therefore a higher accuracy for each of the pixels. For example, it is possible to apply the velocity estimation method described by Netravall and ROBBINS in the U.S. Pat. No. 4,383,272.

As mentioned in FIG. 3, the method according to the invention comprises two main phases. A first phase consists in scanning the pixels of the carrier frame $T_i$ and in determining a son pixel, if one of them exists, in the frame to be interpolated $T_j$, for each pixel of the carrier frame. When all the pixels in the carrier frame have been scanned, a second phase then consists in successively scanning all the pixels in the frame to be interpolated $T_j$, in associating a velocity vector $\vec{V}$ with each pixel of this frame to be interpolated, as a function of the velocity vector of the father pixel or father pixels corresponding with the considered pixel to be interpolated, if there is at least one father pixel; in determining, for each pixel to be interpolated, two base points of the temporal interpolation, in the two known frames $T_a$ and $T_b$; in determining the luminance of these two base points by means of a spatial interpolation in the two known frames $T_a$ and $T_b$, when the base points are not the centers of pixels of these known frames; and finally in determining an interpolated luminance value, for the considered pixel to be interpolated, by linearly combining the luminance values of the two base points according to the formula (2).

Figure 4:
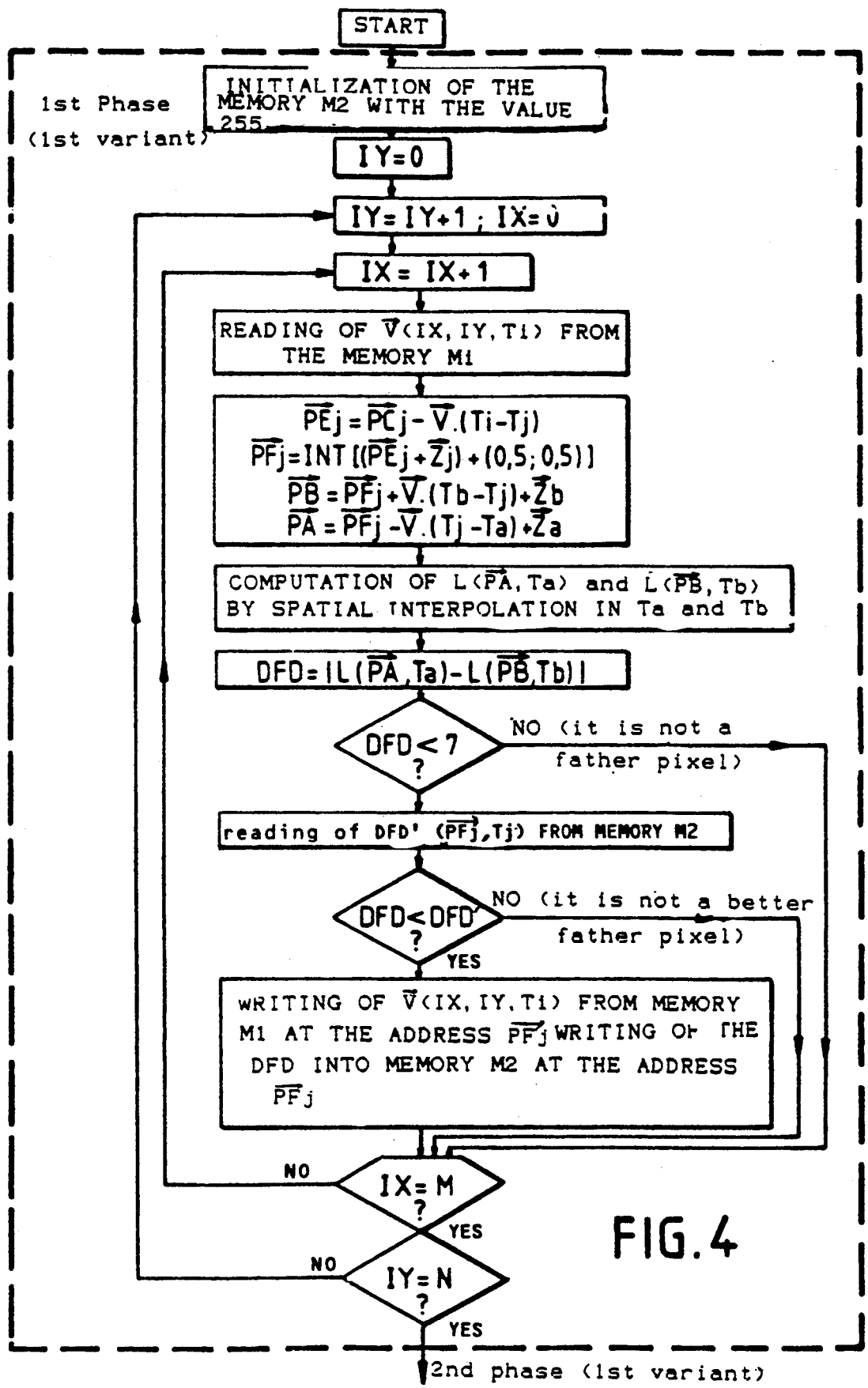
FIGS. 4 and 7 are two flowcharts illustrating a first variant implementation of the method according to the invention.

FIG. 4 shows a flowchart of the first phase of a first variant implementation of the method according to the invention. In this variant, the case in which a pixel to be interpolated has several father pixels is processed by selecting the father pixel which is the best of them. The criterion is the value of a function called the DFD function which is equal to the absolute value of the difference between the luminance values of the two base points A and B. The selection of the best father pixel consists in comparing with one another the values of the DFD function obtained by successively associating the velocity vector of each of the father pixels with the pixel to be interpolated. The father pixel considered to be the best is the one whose velocity vector gives a minimum value to the DFD function.

In addition, according to this first variant, the case of an orphan pixel, that is to say one having no father pixel in the motion carrier frame, is dealt with by determining an interpolated velocity vector from the velocity vectors associated with the adjacent pixels in the frame to be interpolated, insofar as they are not orphans. The value of the DFD function is used as a criterion for detecting the pixels which are orphans. In the case in which it is no longer possible to associate a velocity vector, this variant consists in associating a zero velocity vector.

The first phase of the first variant begins with an initialization of a memory M2 intended for storing the minimum value of the DFD function determined for each pixel of the frame to be interpolated $T_j$. It is initialized with a constant value equal to 255 which corresponds to the maximum value of the luminance of the frames and therefore also of the DFD. The series of frames considered is constituted in fact by a series of interlaced frames, each frame being considered as an independent frame. Each frame comprises a number M of pixels per line and a number N of lines. The memory M2 has a capacity of M×N bytes.

Then the coordinate IY is initialized at zero. Then it is incremented by unity and the coordinate IX is initialized at zero. Then the coordinate IX is incremented by unity. The coordinates (IX,IY) define the center $C_i$ of a pixel in the motion carrier frame $T_i$, and which can be a father pixel. Then the vector $\vec{V}(IX,IY,T_i)$, which is the velocity vector of this pixel) is read from a memory MI at an address corresponding to the coordinates of this pixel. The memory MI is a memory having a capacity of M×N locations and which is previously loaded with the values of the components of the velocity vectors of all of the pixels in the motion carrier frame used for the interpolation of the missing frames in the interval $T_a$, $T_b$.

Then, the coordinates of a point $E_j$ corresponding to the point $C_j$ are determined according to the formula:

$$\vec{PE_j} = \vec{PC_j} - \vec{V}(IX,IY).(T_i - T_j) \quad (4)$$

Then the coordinates of the center $F_j$ of a son pixel are determined by taking the integer part of the components of the vector:

$$\vec{PE_j} + \vec{Z_j} + (0.5 ; 0.5)$$

where (0.5 ; 0.5) enables the finding of the closest integer value of the components, and not just the integer part of the latter; and where $\vec{Z_j}$ is a frame parity correction vector having the components:

(0.5 ; 0.5) if the frames $T_i$ and $T_j$ are frames having the same parity;

(0.5 ; 0) if the frame $T_i$ is an odd frame and the frame $T_j$ is an even frame;

(0.5 ; 1) if the frame $T_i$ is an even frame and if the frame $T_j$ is an odd frame.

The pixel to be interpolated centered on the point $F_j$ is a son pixel of the pixel having the coordinates (IX,IY) in the frame $T_i$. The method then consists in determining the coordinates of two temporal interpolation base points, B and A, in the frames $T_b$ and $T_a$ respectively, according to the formulae:

$$\vec{PB} = \vec{PF_j} + \vec{V}(IX,IY).(T_b - T_j) + \vec{Z_b} \quad (5)$$

$$\vec{PA} = \vec{PF_j} - \vec{V}(IX,IY).(T_j - T_a) + \vec{Z_a} \quad (6)$$

wherein the vector $\vec{Z_b}$ is a frame parity correction vector having the components:

(0 ; 0) if the frame $T_a$ and the frame $T_j$ are frames having the same parity;

(0 ; 0.5) if the frame $T_a$ is an odd frame and if the frame $T_j$ is an even frame;

(0 ; −0.5) if the frame $T_a$ is an even frame and if the frame $T_j$ is an odd frame.

The vector $\vec{Z_b}$ has similar components depending on the parity of the frame constituting the frame $T_j$ and the parity of the frame constituting the frame $T_b$.

The first phase of the first variant then consists in computing the luminance values $L(\vec{PA},T_a)$ and $L(\vec{PB},T_b)$ at the points A and B using a computing method which will be described in detail later and which consists in a spatial interpolation combining the luminance values of the four pixels closest to the point A, and to the point B respectively, when these points do not correspond to the centers of pixels of the frame $T_a$ and of the frame $T_b$. Then it consists in computing the value of the DFD function, which is equal to the absolute value of the difference between the luminances at the points A and B determined for this velocity vector $\vec{V}$.

Then the value of the DFD function is compared with a fixed threshold value of 7 in this example. If the DFD function is less than the threshold value, this signifies that the pixel of coordinates (IX,IY) in the carrier frame constitutes a father pixel for the pixel to be interpolated centered on the point $F_j$. The method then consists in reading, from the memory M2, a value DFD' at an address corresponding to the components of the vector $\vec{PF_j}$. If the DFD value which has just been found for the father pixel having coordinates (IX,IY) in the frame $T_i$ is less than the value DFD' read from the memory M2, this signifies that the father pixel which has just been found is better since its velocity vector makes the value of the DFD function smaller. Its velocity vector is therefore retained in order to be associated with the son pixel centered on the point $F_j$. This velocity vector is written into a memory M1 at an address corresponding to the son pixel, i.e. corresponding to the components of the vector $\vec{PF_j}$. The memory M1 is a memory having M×N locations intended for storing the values of the components of an associated velocity vector for each pixel to be interpolated. Furthermore the value of the DFD function which has just been computed is written into the memory M2 at the address corresponding to the son pixel, in place of the previous value DFD' which corresponds to another father pixel or which is equal to the initialization value.

It should be noted that in the case in which the son pixel did not already have one or more other father pixels, the value of the DFD function read from the memory M2 is equal to the initialization value of the memory M2, i.e. 255.

In the case in which the computed value of the DFD function is greater than 7, then the pixel of coordinates (IX,IY) in the frame $T_i$ is not considered as a father pixel, and the first phase is continued by a test of the value reached by the coordinate IX.

If the computed value of the DFD function is greater than the value DFD' read from the memory M2, this signifies that the pixel of coordinates (IX,IY) in the frame $T_i$ is a father pixel which is not better than a previously found father pixel which has supplied the value DFD' which has just been read from the memory M2 and it must therefore be rejected. The first phase is continued by the test relating to the coordinate IX.

If the coordinate IX has not reached its maximum value which is M, the previous operations are repeated after the incrementation of IX. If IX has reached its maximum value, the first phase is continued with a test relating to the coordinate IY. If this latter coordinate has not reached its maximum value N, the previous operations are repeated after incrementing IY until IY has reached N. The first phase, of the first variant, is now complete and the second phase of this first variant begins.

Figure 5:
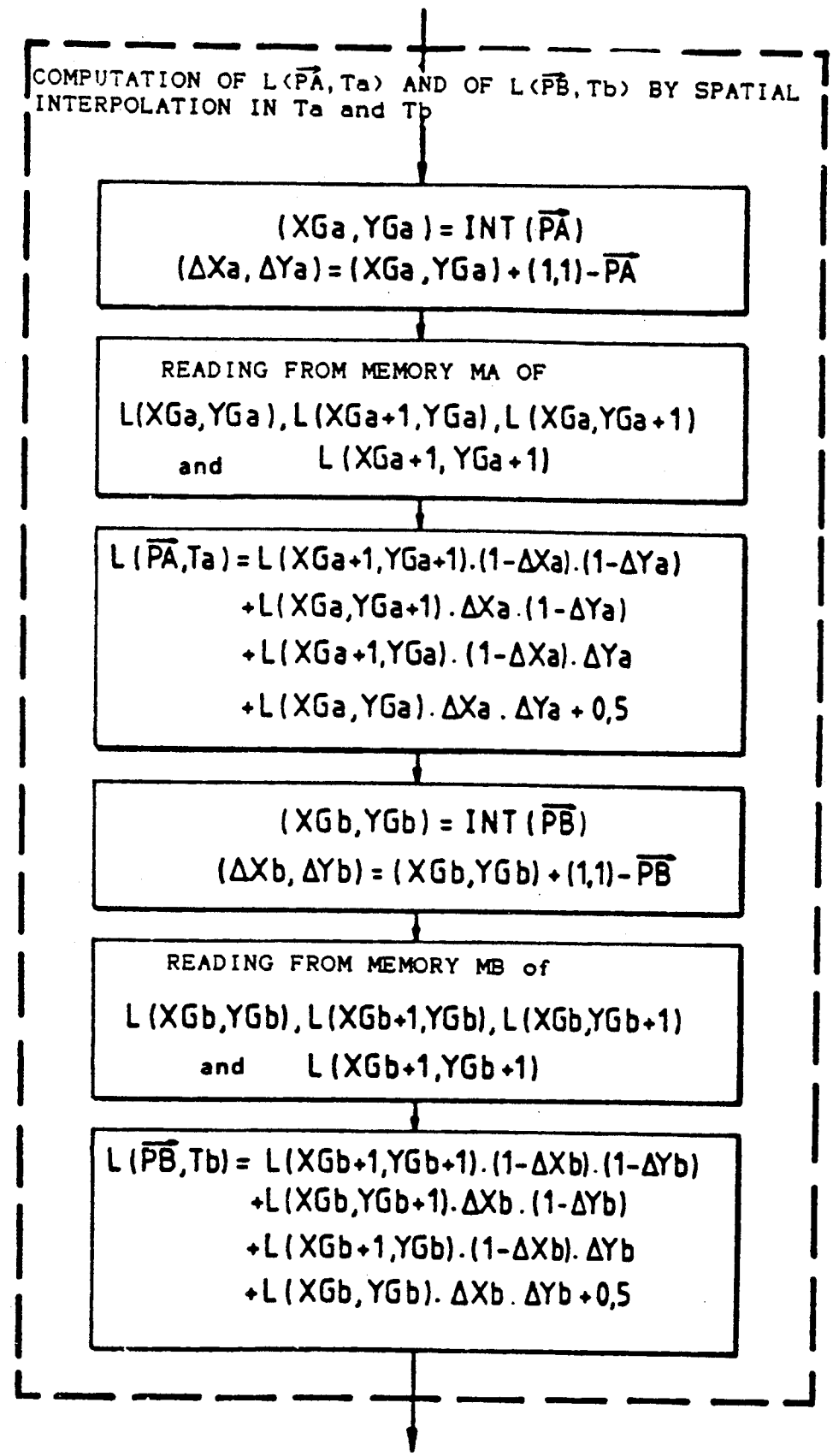
FIG. 5 shows a section of this flowchart.

FIG. 5 shows a flowchart of the operations for computing luminance values $L(\vec{PA},T_a)$ and $L(\vec{PB},T_b)$ by spatial interpolation in the frames $T_a$ and $T_b$ respectively.

Figure 6:
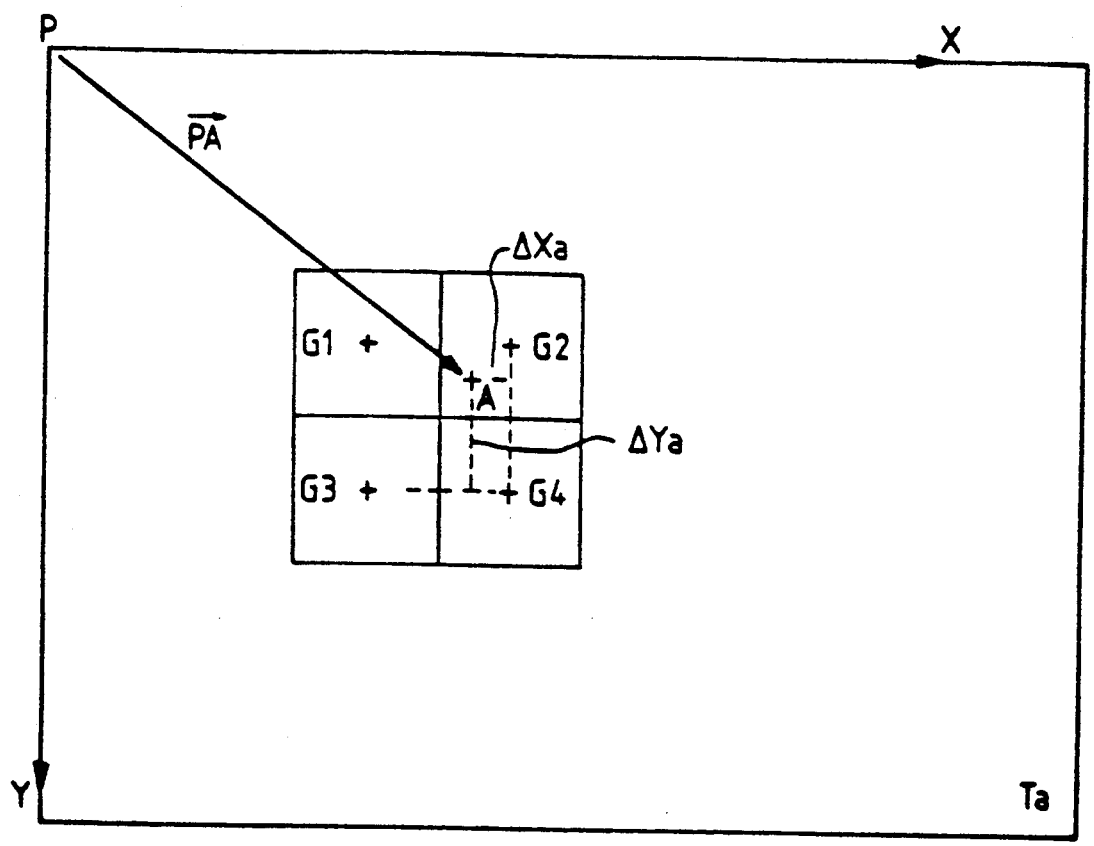
FIG. 6 illustrates the computation performed according to the flowchart in FIG. 5.

FIG. 6 illustrates this computing method for the luminance value $L(\vec{PA},T_a)$. In general, the point A does not coincide with the center of a pixel of the frame $T_a$ but is located between the centers G1, G2, G3 and G4 of four pixels. The spatial interpolation of the luminance value at the point A firstly consists in determining the integer part of the components of the vector $\vec{PA}$ in order to constitute the coordinates $(XG_a, YG_a)$ of the point G1. The coordinates of the point G2 are therefore $(XG_a+1, YG_a)$. The coordinates of the point G3 are therefore $(XG_a, YG_a+1)$. The coordinates of the point G4 are therefore $(XG_a+1, YG_a+1)$. In this example of implementation, the point G4 constitutes the reference point for the interpolation. The method then consists in determining the coordinates $(\Delta X_a, \Delta Y_a)$ for the point A with respect to the reference point G4. These coordinates are given by the formula:

$$(\Delta X_a, \Delta Y_a) = (XG_a, YG_a) + (1,1) - \vec{PA} \quad (7)$$

The method then consists in reading from the memory MA luminance values: $L(XG_a,YG_a), L(XG_a+1,YG_a), L(XG_a,YG_a+1), L(XG_a+1,YG_a+1)$, corresponding to the pixels centered on the points G1 to G4, at addresses corresponding to the coordinates of these points G1 to G4. Then the luminance value $L(\vec{PA},T_a)$ is computed according to the formula:

$$\begin{aligned} L(\vec{PA}, T_a) = \; & L(XG_a + 1, YG_a + 1) \cdot \\ & (1 - \Delta X_a)(1 - \Delta Y_a) + \\ & L(XG_a, YG_a + 1) \cdot \Delta X_a \cdot (1 - \Delta Y_a) + \\ & L(XG_a + 1, YG_a) \cdot (1 - \Delta X_a) \cdot \Delta Y_a + \\ & L(XG_a, YG_a) \cdot \Delta X_a \cdot \Delta Y_a + 0.5 \end{aligned} \quad (8)$$

The computation of the luminance value $L(\vec{PB},T_b)$ is carried out according to an entirely similar series of operations.

Figure 7:
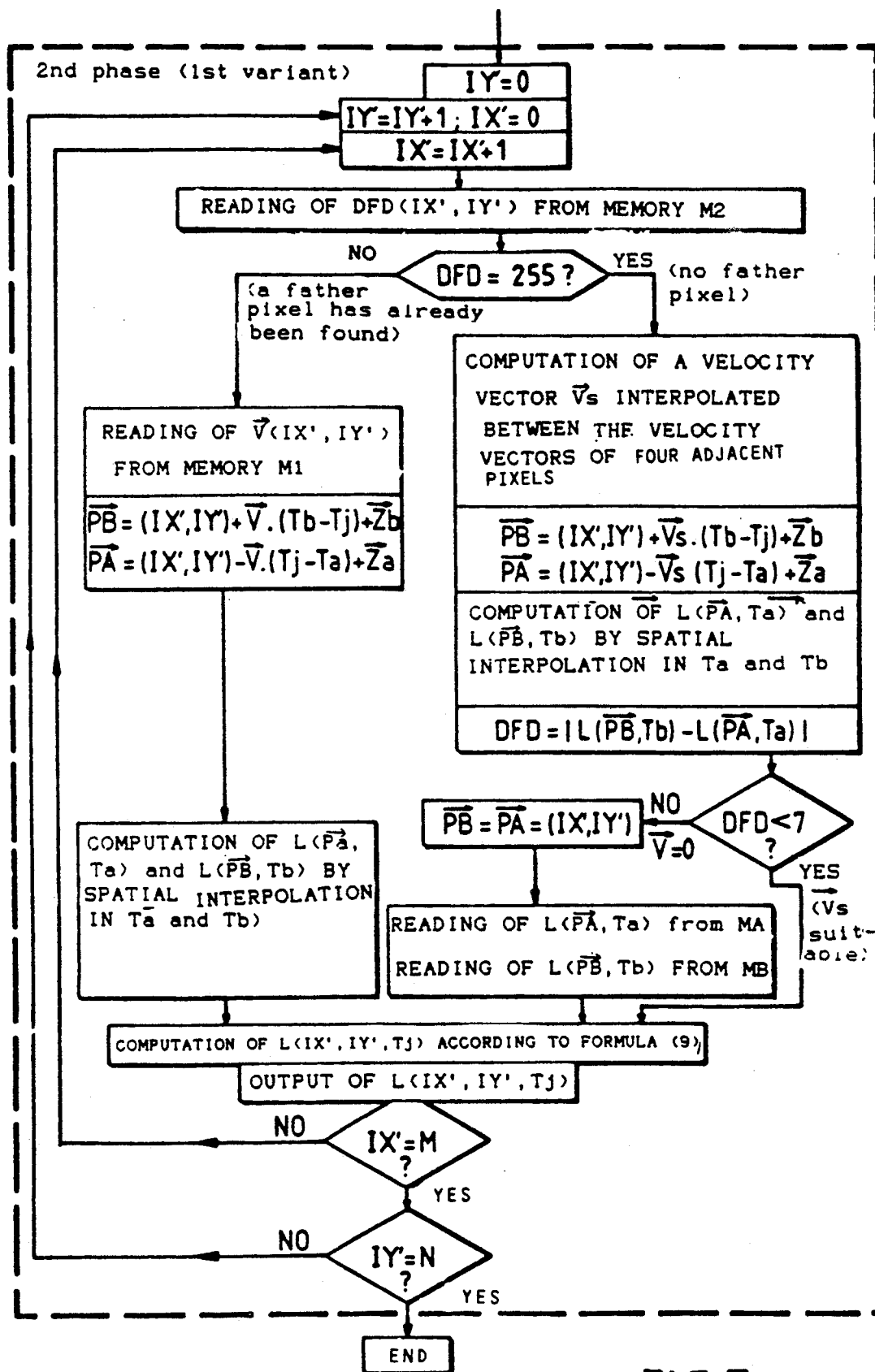

FIG. 7 shows the flowchart of the second phase of the first variant of the implementation of the method according to the invention. This second phase begins with an initialization at zero of a coordinate IY', then an incrementation by unity of this coordinate and an initialization at zero of a second coordinate IX'. The coordinates (IX',IY') are the coordinates of the center of a pixel in the frame to be interpolated $T_j$. Then the method consists in incrementing the coordinate IX' and in reading the DFD value (IX',IY') stored in the memory M2 at an address corresponding to the coordinates (IX',IY'). The value which is read is compared with a threshold value equal to the value 255 which was used to initialize the memory M2 and which is equal to the maximum value of the luminance.

If the value which is read is not equal to 255, this signifies that a value of the DFD function has been computed previously for this pixel to be interpolated, because it is the son pixel of a pixel in the motion carrier frame $T_i$. A velocity vector has therefore been associated with it previously, during the first stage of the method. This velocity vector is read from the memory M1 at the address corresponding to the coordinates (IX',IY') and then it is used for computing the vectors $\vec{PB}$ and $\vec{PA}$ according to the equations (5) and (6). These vectors $\vec{PB}$ and $\vec{PA}$ determine two base points A and B for the temporal interpolation. They are used for computing the luminance values $L(\vec{PA},T_a)$ and $L(\vec{PB},T_b)$ by means of a spatial interpolation in the frames $T_a$ and $T_b$, according to the flowchart shown in FIG. 5 and described previously.

If the value of the DFD function read from the memory M2 has remained equal to the initialization value, 255, this signifies that the first phase of the method has never detected the pixel of coordinates (IX',IY') as a son pixel of a father pixel located in the motion carrier frame $T_i$. The pixel to be interpolated, of coordinates (IX',IY') is therefore an orphan pixel and it is necessary to associate it with a velocity vector by another means. According to this first variant, a velocity vector is computed by interpolating between the velocity vectors of four pixels adjacent to the orphan pixel, insofar as they are not themselves orphan pixels. This computation is performed by reading from the memory M2 the values of the DFD function and by reading from the memory M1 the components of the velocity vector $\vec{V}$ for the four adjacent points whose coordinates are:

(IX',IY'−1), (IX'−1,IY'), (IX'+1,IY'), (IX',IY'+1)

The value of the interpolated velocity vector $\vec{V_s}$ is then computed according to the formula:

$$\vec{V_s}(IX', IY') = \frac{1}{A_{00} + A_{01} + A_{10} + A_{11}} (A_{00} \cdot \vec{V}(IX', IY') + \quad (9)$$

$$A_{01} \cdot \vec{V}(IX' - 1, IY') + A_{10} \cdot \vec{V}(IX' + 1, IY') + A_{11} \cdot \vec{V}(IX', IY'))$$

where
$A_{00}=0$ if DFD(IX',IY'−1)=255
$A_{00}=1$ otherwise.
$A_{01}=0$ if DFD(IX'−1,IY')=255
$A_{01}=1$ otherwise.
$A_{10}=0$ if DFD(IX'+1,IY')=255
$A_{10}=1$ otherwise.

$A_{11}=0$ if DFD(IX',IY'+1)=255
$A_{11}=1$ otherwise.
And $\vec{V_s}$(IX',IY')=(0,0) if $A_{00}=A_{01}=A_{10}=A_{11}=0$, i.e. if the four adjacent pixels are also orphan pixels.

The vectors $\vec{PB}$ and $\vec{PA}$ are then computed according to the formulae (5) and (6) wherein the vector $\vec{V}$ is constituted by the interpolated vector $\vec{V_s}$. Then the luminance values $L(\vec{PA},T_a)$ and $L(\vec{PB},T_b)$ are next determined by means of a spatial interpolation in the frames $T_a$ and $T_b$, according to the previously described flowchart shown in FIG. 5. Then the value of the DFD function is computed for the base points A and B thus determined.

If this value of the DFD function is less than the threshold value 7, this signifies that the velocity vector $\vec{V_s}$ constitutes a suitable estimation of the velocity vector of the considered orphan pixel. It can then be associated with this orphan pixel. The method then consists in computing the interpolated luminance value of the considered orphan pixel, $L(IX',IY',T_j)$ according to the formula (9).

If the value of the DFD function is greater than the threshold value, this signifies that the interpolated velocity vector is not suitable and cannot be associated with the considered orphan pixel. As a last resort, a zero velocity vector is associated with the orphan pixel. The two base points of the temporal interpolation, A and B, then have the same coordinates (IX',IY') as the center of the pixel to be interpolated and, consequently, the vectors $\vec{PB}$ and $\vec{PA}$ are equal to each other and have the components (IX',IY'). The luminance values $L(\vec{PA},T_a)$ and $L(\vec{PB},T_b)$ are then determined without spatial interpolation in the frames $T_a$ and $T_b$, since IX' and IY' are integer values. They are read from the memories MA and MB respectively at the addresses corresponding to (IX',IY'). Then the interpolated luminance value $L(IX',IY',T_j)$ is computed according to the formula:

$$L_{interpolated} = \frac{T_b - T_j}{T_b - T_a} \cdot L(\vec{PA}, T_a) + \frac{T_j - T_a}{T_b - T_a} L(\vec{PB}, T_b) \quad (10)$$

Each time that an interpolated luminance value $L(IX',IY',T_j)$ has been computed, this value is supplied, for example, to a frame memory storing the interpolated values of the frame $T_j$ while waiting for a utilization of these luminance values. Then the value of the coordinate IX' is compared with its maximum value M in order to determine if it has reached this maximum value. If it has not reached it, the previous operations are repeated after the incrementation of IX'. If it has reached its maximum value, the value of the second coordinate IY' is compared with its maximum value N. If it has not reached its maximum value, the previous operations are repeated after the incrementation of IY'. If it has reached its maximum value, this signifies that all of the pixels to be interpolated have been scanned and that, consequently, the temporal interpolation processing of the frame $T_j$ is finished.

Figure 8:
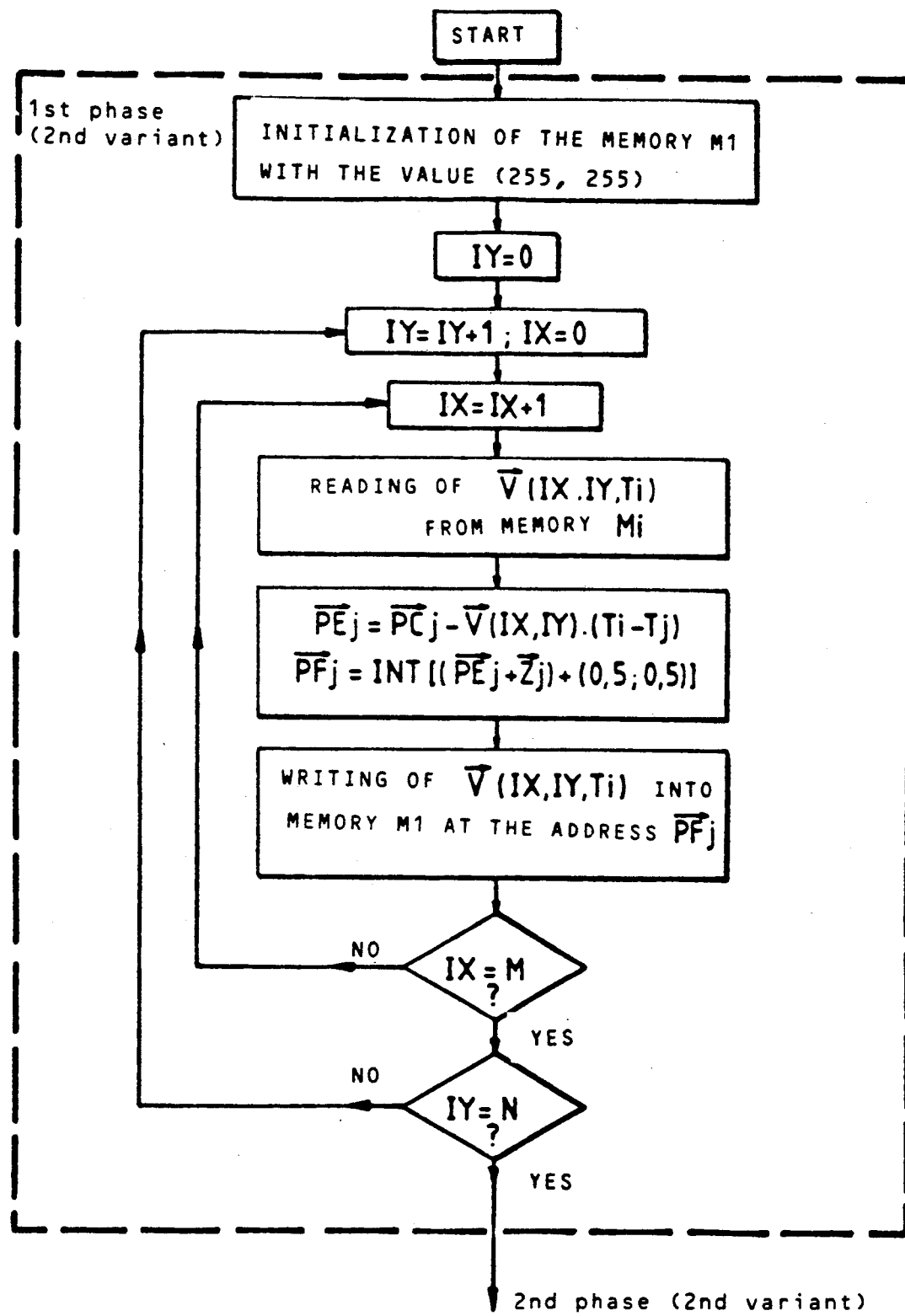
FIGS. 8 and 9 show a flowchart of a second implementation of the method according to the invention.

FIG. 8 shows a flowchart of the first phase of the method according to the invention, according to a second variant implementation, enabling a simplification of the computations and elimination of the memory M2 as this variant does not use the DFD function. The first phase starts with an initialization of the memory M1 with the value (255,255) which constitutes the maximum value of the components of the velocity vector associated with each pixel to be interpolated. Furthermore the ordinate IY of the pixels of the motion carrier frame $T_i$ is initialized at zero. Then this ordinate IY is incremented by unity, and the abscissa IX of the pixels of the motion carrier frame $T_i$ is initialized at zero. Then this abscissa is incremented by unity. The value of the components of the velocity vector $\vec{V}(IX,IY,T_i)$ is read from the memory MI and is then used for computing the components of the vector $\vec{PE_j}$ and the components of the vector $\vec{PF_j}$. Then this velocity vector is written into the memory M1 at the address corresponding to the components of the vector $\vec{PF_j}$, i.e. at the address corresponding to the coordinates of the son pixel.

Then the value of the coordinate IX is compared with its maximum value M. If this has not been reached the previous operations are repeated after the incrementation of IX. If it has been reached, the value of the coordinate IY is compared with its maximum value N. If this value has been reached, the first phase is finished and a second phase begins. If IY has not reached its maximum value N, the previous operations are repeated after the incrementation of IY.

Figure 9:
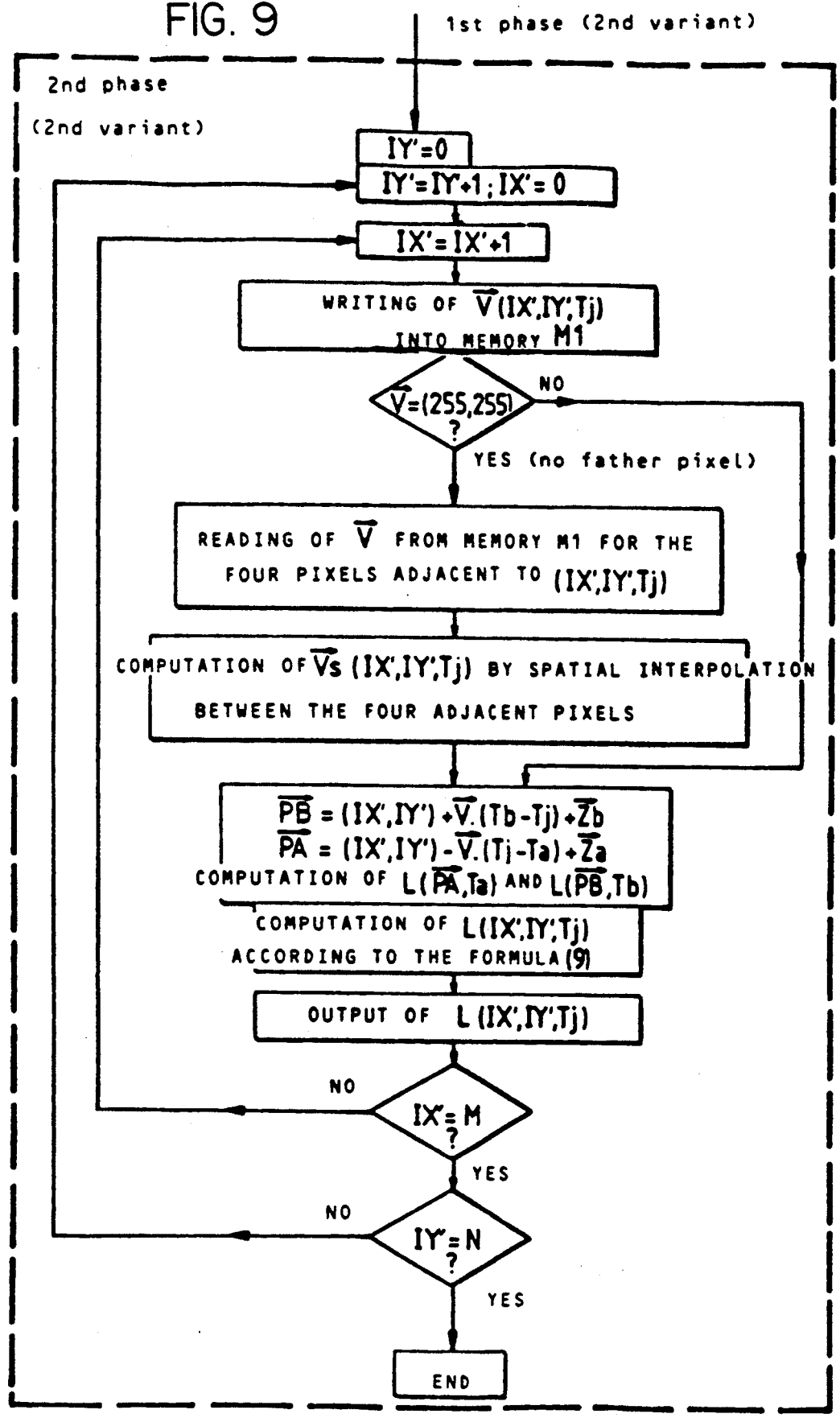

FIG. 9 shows a flowchart of the second phase of the second variant implementation of the method according to the invention. This second phase starts with an initialization at zero of the coordinate IY' of the pixels to be interpolated. Then it consists in incrementing the coordinate IY' and in initializing at zero the coordinate IX'. Then it consists in incrementing by unity the coordinate IX' and in reading the velocity vector $\vec{V}(IX',IY',T_j)$ from the memory M1 at an address corresponding to the coordinates (IX',IY').

Each of the components of this velocity vector are compared with the value 255 which is their initial value loaded in the memory M1. If the components of the velocity vector are equal to their initial value, this signifies that no velocity vector has been associated with the pixel of coordinates (IX',IY'). The latter is therefore an orphan pixel and it is necessary to determine the velocity vector to be associated with this pixel in another way. An interpolated velocity vector $\vec{V_s}$ is computed by means of a spatial interpolation from the velocity vectors of the four pixels adjacent to the orphan pixel. The velocity vectors of these four adjacent pixels are read from the memory M1 and are then linearly combined according to the equation (9) but taking:

$A_{00}=0$ if $\vec{V}(IX'-1,IY')=(255,255)$
$A_{00}=1$ otherwise.
$A_{01}=0$ if $\vec{V}(IX'-1,IY')=(255,255)$
$A_{01}=1$ otherwise.
$A_{10}=0$ if $\vec{V}(IX'+1,IY')=(255,255)$
$A_{10}=1$ otherwise.
$A_{11}=0$ if $\vec{V}(IX',IY'+1)=(255,255)$
$A_{11}=1$ otherwise.
And $\vec{V_s}(IX',IY')=(0,0)$ if $A_{00}=A_{01}=A_{10}=A_{11}=0$, i.e. if the four adjacent pixels are themselves also orphan pixels.

It should be noted that the absence of use of the DFD function does not prevent the detection of whether a pixel to be interpolated is or is not an orphan, thanks to the initialization of the memory M1 with the value (255,255) which enables the discrimination of the velocity vector values which do not exist. On the other hand, the first phase does not distinguish the best father pixel when a pixel to be interpolated has several father pixels and, consequently, the associated velocity vector is that corresponding with the last father pixel found, for a given pixel to be interpolated, when there are several father pixels.

When the velocity vector $\vec{V}(IX',IY',T_j)$ has components different from 255, this signifies that the pixel to be interpolated has an associated velocity vector which has been determined during the first phase. The method then consists in computing the vectors $\vec{PB}$ and $\vec{PA}$ according to the formulae (5) and (6) for the velocity vector read from the memory M1 or for the interpolated velocity vector $\vec{V}_s$, associated with the pixel (IX',IY'). Then it consists in computing the luminance values $L(\vec{PA},T_a)$ and $L(\vec{PB},T_b)$. When the velocity vector is not zero this computation is performed by a spatial interpolation in the frames $T_a$ and $T_b$ respectively, according to the previously described flowchart shown in FIG. 5. When the velocity vector is zero, these two luminance values are read from the memories MA and MB at the address corresponding to (IX',IY'). Then the method consists in computing the interpolated luminance value $L(IX',IY',T_j)$ according to the formula (10). The interpolated luminance value is then supplied, for example, to a frame memory in order to be stored while waiting for a utilization of the interpolated frame $T_j$.

Then the value of the coordinate IX' is compared with its maximum value M. If the maximum value has not been reached, the previous operations are repeated after the incrementation of IX'. Otherwise the value of the coordinate IY' is compared with its maximum value N. If this maximum value has not been reached, the previous operations are repeated after the incrementation of IY'. When IY' has reached the maximum value N, the interpolation processing of the frame $T_j$ is finished.

Figure 10:
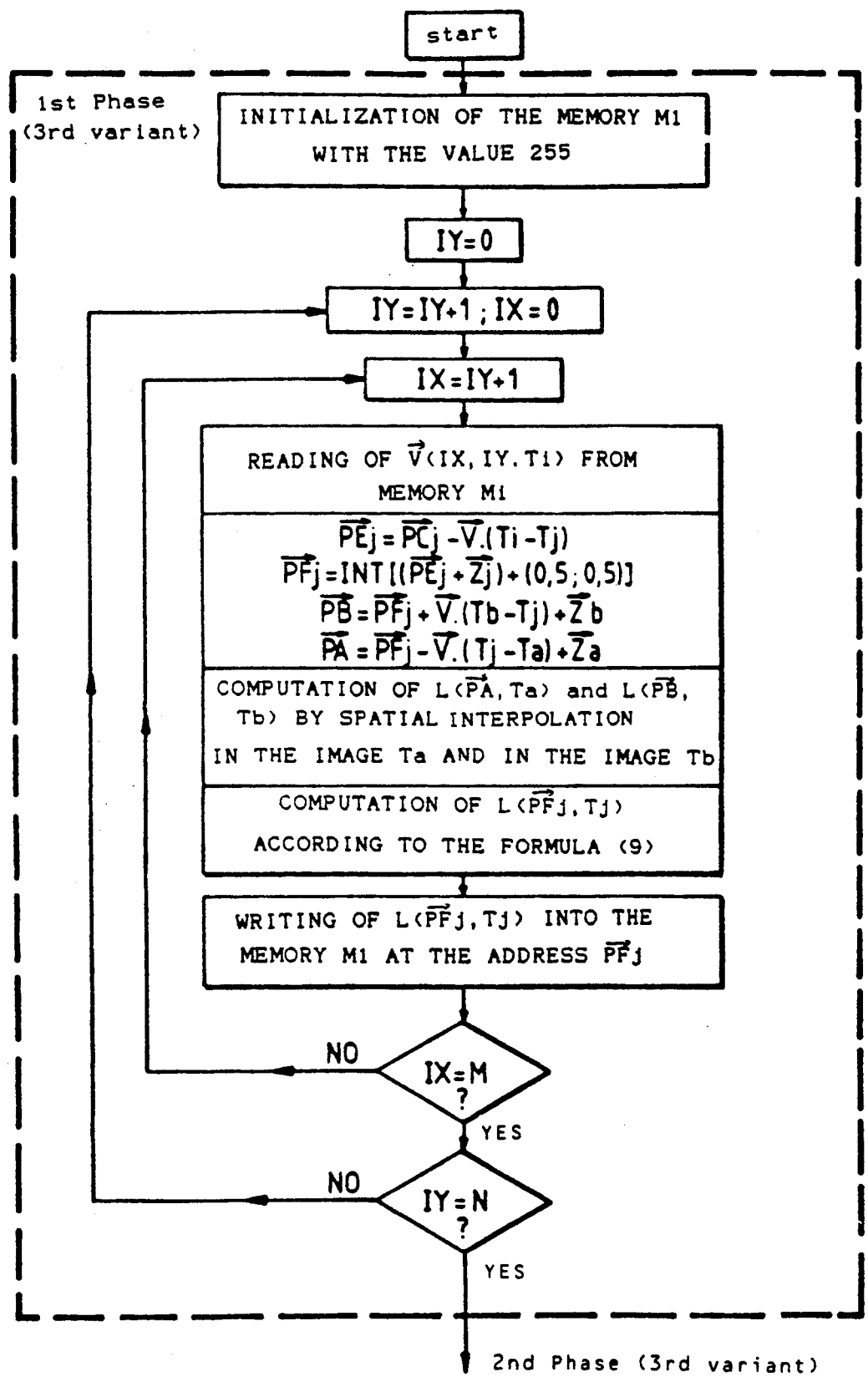
FIGS. 10 and 11 show a flowchart of a third variant implementation of the method according to the invention.

FIG. 10 shows a flowchart of the first phase of the method according to the invention for a third variant implementation of this method. This third variant implementation does not necessitate computation of the DFD function and does not necessitate a memory M2, as in the second variant. It has, with respect to the second variant, the advantage of enabling the storage of interpolated luminance values without having an additional frame memory as this third variant enables the memory M1 to be used again for the storage of interpolated luminance values. During this first phase, in this third variant, instead of storing the velocity vectors associated with the son pixels in the memory M1 during the progress of the scanning of the father pixels of the motion carrier frame, it consists in computing and in storing in M1 the interpolated luminance values corresponding to these son pixels. Thus, during the second phase it is now only necessary to compute an interpolated luminance value for each orphan pixel. The value of the components of the velocity vectors of the adjacent pixels not being stored, it is not possible to use an interpolation in order to compute a velocity vector to associate with each orphan pixel. The velocity vector associated with the orphan pixel is therefore taken as zero.

The first phase of this third variant starts with an initialization of the memory M1 with the value 255 which corresponds with the maximum value of the luminance and which is therefore easy to discriminate in order to detect the orphan pixels, it being possible to discriminate the latter by the fact that the corresponding value of the luminance, stored in the memory M1, remains equal to 255 at the end of the first phase of the method. It also starts with an initialization of the coordinate IY at zero.

Then it consists in incrementing IY by unity and in initializing the coordinate IX at zero. It then consists in incrementing the coordinate IX by unity, and then in reading the velocity vector $\vec{V}(IX,IY,T_i)$ from the memory MI; then in computing the vectors $\vec{PE}_j$, $\vec{PF}_j$, $\vec{PB}$, $\vec{PA}$, according to the formulae (4) to (6). Then it consists in computing the luminance values $L(\vec{PA},T_a)$ and $L(\vec{PB},T_b)$ by a spatial interpolation in the frames $T_a$ and $T_b$, according to the previously described flowchart shown in FIG. 5. Then it consists in computing the interpolated luminance value $L(\vec{PF}_j,T_j)$, corresponding to the son pixel centered on the point $F_j$, according to the formula (10); in writing this luminance value into the memory M1 at an address corresponding to the components of the vector $\vec{PF}_j$.

The first phase then consists in testing the value of the coordinate IX in order to detect if it has reached its maximum value M. If the value M has not been reached, it consists in repeating the previous operations after the incrementation of IX. When IX has reached the maximum value M, it consists in comparing the value of the coordinate IY with its maximum value N. If IY has reached the value N, the first phase is finished. Otherwise, the previous operations are repeated after the incrementation of the coordinate IY.

Figure 11:
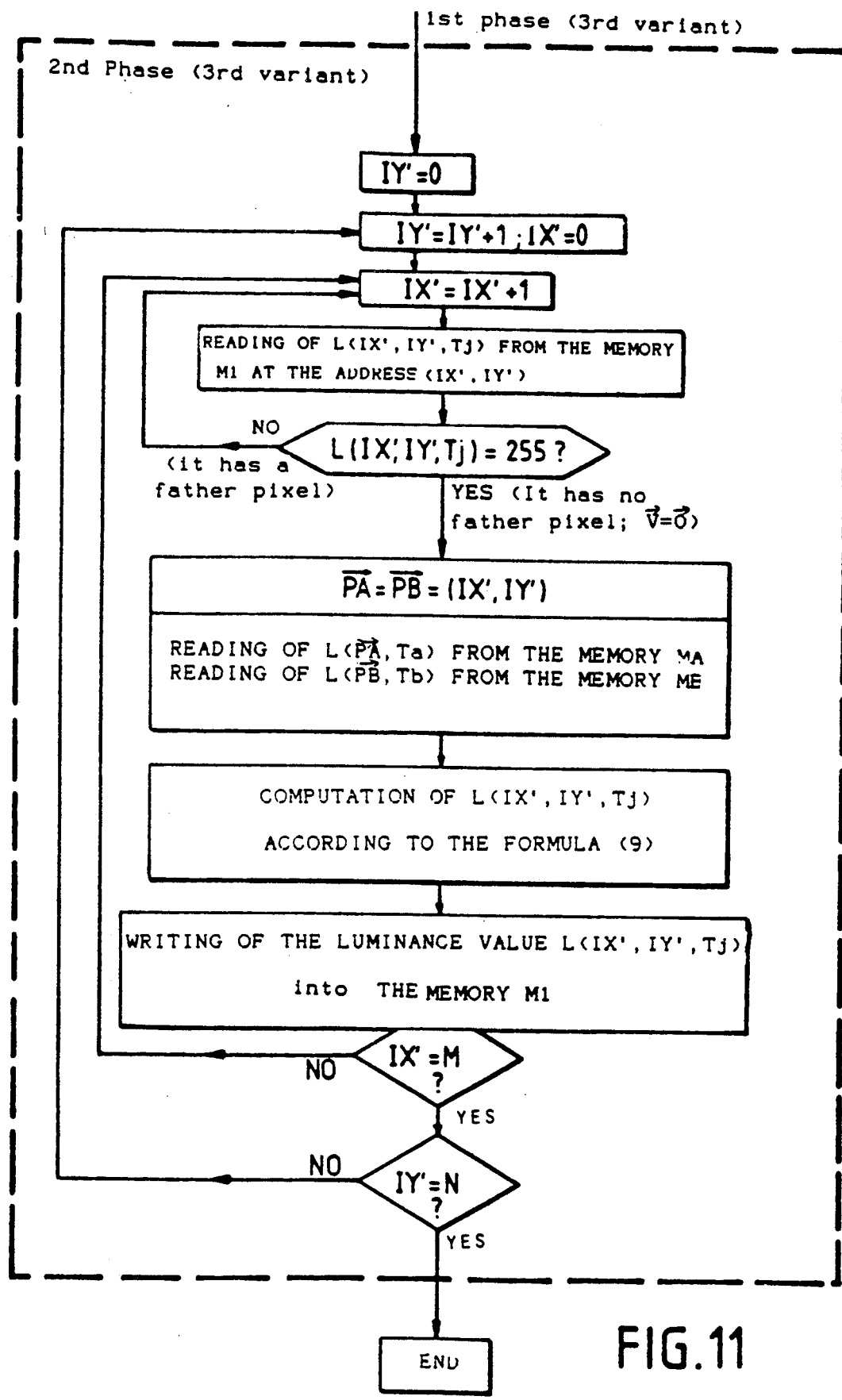

FIG. 11 shows a flowchart of the second phase of the third variant implementation of the method according to the invention. This second phase consists firstly in initializing at zero the coordinate IY' of a pixel of the frame to be interpolated $T_j$; then in incrementing this coordinate IY' by unity and in initiating at zero a second coordinate IX'. Then it consists in incrementing the coordinate IX' by unity; in reading the luminance value stored in the memory M1 at the address corresponding to the coordinates (IX',IY'); and in comparing this luminance value with the value 255 which is the value initially loaded in the memory M1.

If the luminance value is different from 255 this signifies that a luminance value has been determined during the first phase, for the pixel to be interpolated having coordinates (IX',IY'). If the luminance value is equal to 255, this signifies that this pixel to be interpolated has no father pixel in the motion carrier frame $T_i$. In this case, a zero velocity vector is allocated to this orphan pixel, and the vectors $\vec{PA}$ and $\vec{PB}$ have components equal to those of the vector bearing the center of the pixel to be interpolated, i.e. (IX',IY'). Then the luminance values of two base points of the temporal interpolation, $L(\vec{PA},T_a)$ and $L(\vec{PB},T_b)$ are read from the memories MA and MB at the address corresponding to (IX',IY'). Then an interpolated luminance value $L(IX',IY',T_j)$ is computed according to the formula (9).

Finally, the interpolated luminance value is written into the memory M1 at the address corresponding to the coordinates (IX',IY') in order to be stored there while waiting for a utilization of luminance values of the interpolated frame $T_j$. At the end of the processing of all of the pixels of the frame to be interpolated, the memory M1 will be filled with the interpolated luminance values. The memory M1 therefore performs the function of the additional frame memory which was necessary for storing the interpolated luminance values according to the previously described first and the second variant implementations.

Then this second phase consists in comparing the value of the coordinate IX' with its maximum value M. If IX' has not reached its maximum value, the second phase then consists in repeating the previous operations after the incrementation of IX'. If IX' has reached its maximum value, the second phase then consists in comparing the value of the coordinate IY' with its maximum value N. If IY' has not reached its value N, the previous operations are repeated after the incrementation of IY'. If IY' has reached its maximum value, the processing of all of the pixels to be interpolated is finished.

Figure 12:
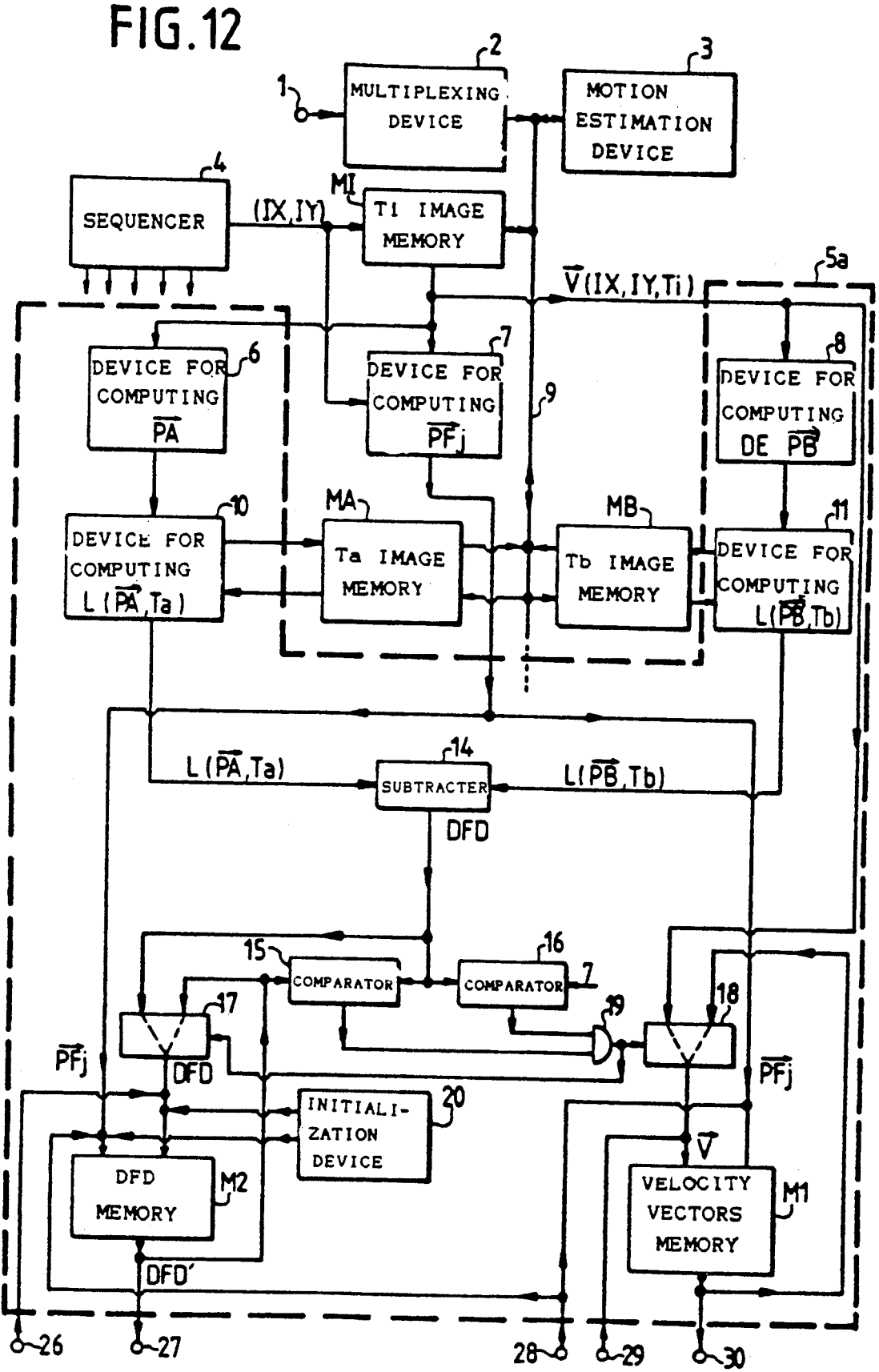
FIGS. 12 and 15 show the block diagram of one embodiment of a device for implementing the method according to the invention.

FIG. 12 shows the block diagram of a first section of a device for the implementation of the method according to the invention, according to the previously described first variant. This first section comprises: an input terminal 1, a multiplexing device 2, a device for estimating motion 3, a sequencer 4, a memory 5 called memory MI, a device 7 for computing the vector $\vec{PF_j}$, an address and data bus 9, a computing device 10, a memory MA for storing the luminance values of the frame corresponding to the instant $T_a$, a memory MB for storing the luminance values of the frame corresponding to the instant $T_b$, and means of computation 5a for associating a velocity vector with each pixel to be interpolated and having at least one father pixel.

These means of computation 5a comprise: a device 6 for computing the vector $\vec{PA}$, a device 8 for computing the vector $\vec{PB}$, a device 10 for computing $L(\vec{PA}, T_a)$, a device 11 for computing $L(\vec{PB}, T_b)$, a subtracter 14, two comparators 15 and 16, two multiplexers 17 and 18 each having two inputs and one output, a logic AND gate 19, an initialization device 20, a memory M1 for storing the velocity vectors associated with the pixels to be interpolated, and a memory M2 for storing the values of the DFD function.

The multiplexing device 2 has one input connected to the input terminal 1 of the interpolation device in order to receive a series of luminance values corresponding to a series of known frames constituted by frames of conventional television frames. These luminance values are supplied, for example, by a television camera and an analog-digital converter. The device 2 has one output connected to the bus 9, which is a data, address and instruction bus, for transmitting the luminance values either to the memory MA or to the memory MB. In the considered example, the frame corresponding to the instant $T_a$ is assumed to precede the frame corresponding to the instant $T_b$, but during the processing of a series of frames the memories MA and MB are used alternately in order to store the most recent frame.

The sequencer 4 supplies control signals to the whole of this embodiment and in particular to the device 2, in synchronism with the luminance values applied to the input terminal 1. The device 3 for estimation of motion has one input-output connected to the bus 9 to enable it to control the reading of luminance values from the memories MA and MB, and the writing of the values of the components of the velocity vector of the pixels of the frame $T_i$ in the memory MI.

The device 3 is embodied, for example, according to the description in the U.S. Pat. No. 4,383,272. It provides an estimation of the motion constituted by the components of a velocity vector for each pixel of a frame corresponding to an instant $T_i$ between the instants $T_a$ and $T_b$, as a function of the luminance values of the known frames at the instants $T_a$ and $T_b$. The memory MI has an address input connected to an output of the sequencer 4 in order to receive an address constituted by the coordinates (IX,IY) of a pixel of the motion carrier frame $T_i$. The sequencer 4 supplies a series of coordinates corresponding to the usual order of scanning a frame of the television frame. This series of coordinates is also supplied to a first input of the computing device 7. A second input of the computing device 7 is connected to a data output of the memory MI in order to receive the value of the components of the velocity vector $\vec{V}(IX,IY,T_i)$ read from the memory MI at the address (IX,IY). The value of these components is also applied to an input of the computing device 6, to an input of the computing device 8, and to a first input of the multiplexer 18.

The computing devices 6, 7 and 8 operate in parallel to determine the components of the vectors $\vec{PA}$, $\vec{PF_j}$ and $\vec{PB}$ respectively. For each pixel having coordinates (IX,IY) in the motion carrier frame Ti, the computing device 7 determines the center $F_j$ of a son pixel, if one of them exists; the computing devices 6 and 8 determine the coordinates of the base points A and B for a temporal interpolation, for the purpose of computing a luminance value for the son pixel. The devices 6 and 8 respectively supply the components of the vector $\vec{PA}$ and of the vector $\vec{PB}$ to an input of the computing device 10 and to an input of the computing device 11.

The computing device 10 has an output and an input respectively connected to an address input and to a data output of the memory MA, in order to control, in the memory MA, the reading of the luminance values necessary for a spatial interpolation from pixels adjacent to the point A in the frame $T_a$. Similarly, the device 11 has an output and an input respectively connected to an address input and to a data output of the memory MB in order to read from it the luminance values necessary for a spatial interpolation between the pixels adjacent to the point B in the frame $T_b$. The luminance values $L(\vec{PA}, T_a)$ and $L(\vec{PB}, T_b)$ respectively computed by the devices 10 and 11 are respectively applied to two inputs of the subtracter 14 in order to compute a value of the DFD function. The subtracter 14 supplies an algebraic value whose absolute value constitutes the value of the DFD function.

The latter is applied to a first input of the multiplexer 17 and to first inputs of the comparators 15 and 16. A second input of the comparator 15 receives a value DFD' of the DFD function read from the memory M2 at an address constituted by the components of the vector $\vec{PF_j}$, i.e. corresponding to the son pixel being processed. The comparator 19 has a second input receiving a threshold value: 7. The comparators 15 and 16 each have an output connected to an input of the logic AND gate 19 in order to validate the latter when the value of the DFD function supplied by the subtracter 14 is less than the threshold value 7 and less than the value DFD' read from the memory M2.

The gate 19 has an output connected to a control input of the multiplexer 17 and to a control input of the multiplexer 18. The second input of the multiplexer 17 is connected to the data output of the memory M2. The first and second inputs of the multiplexer 18 are respectively connected to the data output of the memory MI supplying the vector $\vec{V}(IX,IY,T_i)$, and to an output of the memory M1 supplying the value of the components of a velocity vector read at the address constituted by the components $\vec{PF_j}$.

The memories M1 and M2 each have an address input connected to the output of the computing device 7 in order to receive the value of the components of the vector $\vec{PF_j}$. Initially, the sequencer 4 controls in the memories M1 and M2 a reading at the address constituted by the components of the vector $\vec{PF_j}$. This reading enables the value DFD' of the DFD function and the value of the components of the velocity vector found previously, if the pixel centered on the point $F_j$ has at least one father pixel having been determined previously, to be known.

If the value of the DFD function supplied by the subtracter 14, for the father pixel having coordinates (IX,IY), is less than 7 and less than the value DFD', determined for another previously found father pixel, then the signal supplied by the output of the gate 19 commands the multiplexers 17 and 18 to respectively transmit the value of the DFD function supplied by the subtracter 14 and the velocity vector supplied by the output of the memory MI.

If the value of the DFD function supplied by the output of the subtracter 14 is greater than 7 or greater than the value DFD' read from the memory M2, then the multiplexers 17 and 18 respectively transmit the value DFD' supplied by the memory M2 and the velocity vector supplied by the memory M1. The output of the multiplexer 17 and the output of the multiplexer 18 are respectively connected to data inputs of the memories M2 and Mi.

Secondly, the sequencer 4 controls a writing in these memories in order to enter the value of the DFD function transmitted by the multiplexer 17 and the velocity vector transmitted by the multiplexer 18. The content of the memories M2 and M1 is therefore renewed when a better father pixel is detected.

An initialization device 20 has two outputs respectively connected to the address input and to the data input of the memory M2 in order to supply it with a series of address values enabling the writing of the value 255 at all the addresses during an initialization phase preceding the processing of each frame. During this initialization phase, the device 20 and the memory M2 are controlled by the sequencer 4 in order to perform this writing. The address input and the data input of the memory M2 are also connected to an input terminal 26 and to an input terminal 28 which are connected to the second section of this embodiment. The data output of the memory M2 and the data output of the memory M1 are respectively connected to two output terminals 27 and 30, connected to the second section of this embodiment. The address input and the data input of the memory M1 are respectively connected to the input terminal 28 and to an input terminal 29, connected to the second section of this embodiment.

Figure 13:
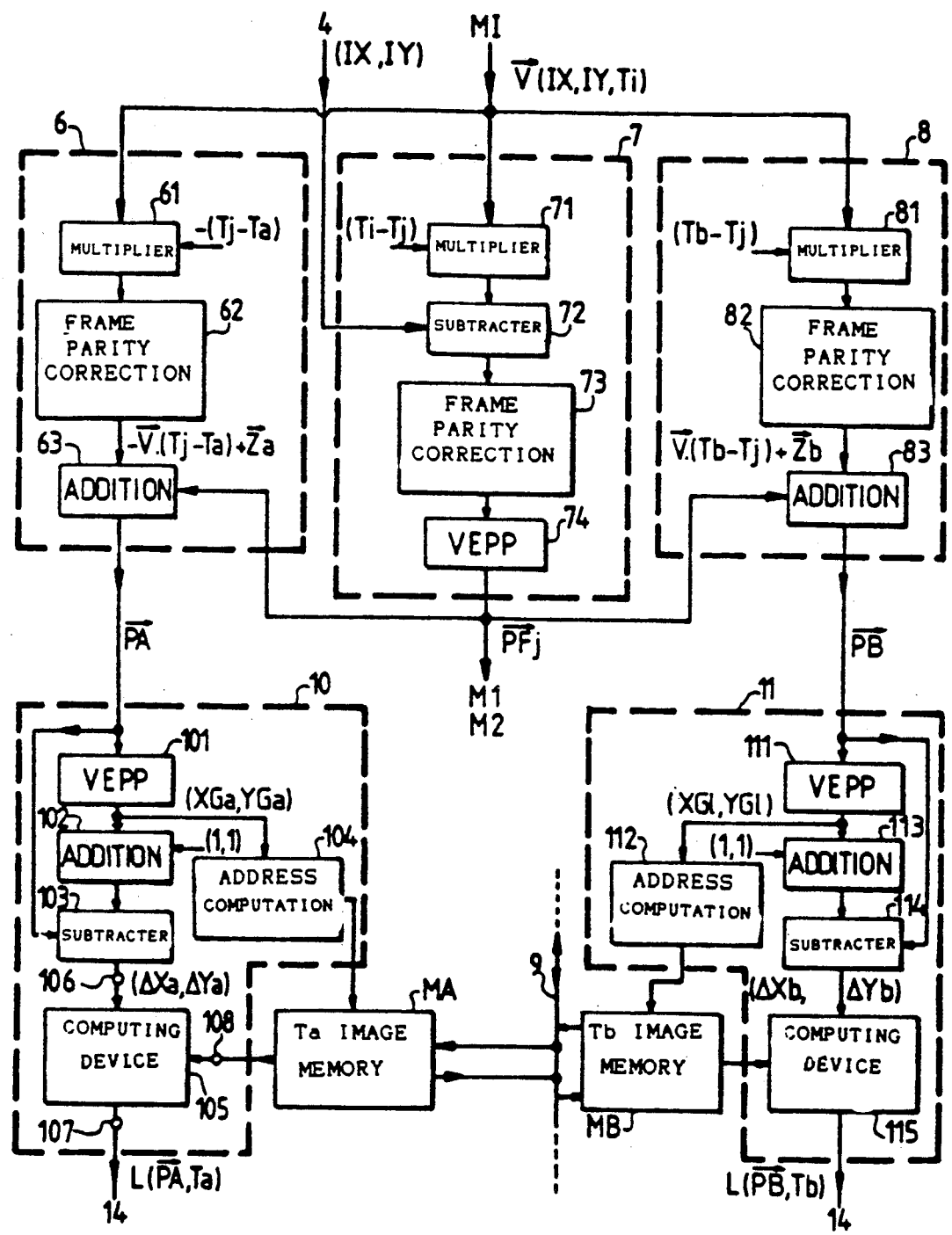
FIGS. 13, 14 and 16 show a more detailed block diagram of three sections of this embodiment.

FIG. 13 shows a more detailed block diagram of the computing devices 6, 7, 8, 10 and 11. The device 6 comprises a multiplier 61, a frame parity correction device 62, and an adder 63. The input of the device 6, receiving the value of the components of the vector $\vec{V}(IX,IY,T_i)$, is connected to a first input of the multiplier 61. A second input of the multiplier 61 receives the value $-(T_j-T_a)$ continuously. An output of the multiplier 61 is connected to an input of the device 62 in order to supply it with the value of the components of a vector: $-\vec{V}.(T_j-T_a)$.

The device 62 adds to the value of these components the value of the components of the vector $\vec{Z_a}$ which depends on the parity of the frame being interpolated and and of the frame $T_a$. The device 62 is connected, by connections which are not shown, to outputs of the sequencer 4 supplying control signals depending on the parity of these two frames. The device 62 can be constituted from adders and a read only memory storing the value of the components of the vector $\vec{Z_a}$, this read only memory receiving an address constituted by the control signals supplied by the sequencer 4. The adder 63 has: an input connected to the output of the device 62, another input connected to the output of the computing device 7 in order to receive the value of the components of the vector $\vec{PF_j}$, and an output constituting the output of the device 6, this output supplying the value of the components of the vector $\vec{PA}$.

The computing device 8 has a structure very similar to that of the computing device 6. It comprises a multiplier 81, a frame parity correction device 82 and an adder 83. The multiplier 81 receives the value $(T_b-T_j)$ instead of the value $-(T_j-T_a)$, and the device 82 adds the value of the components of the vector $\vec{Z_b}$ instead of the value of the components of the vector $\vec{Z_a}$. The value of the components of the vector $\vec{Z_b}$ depends on the parity of the frame $T_j$ and of the frame $T_b$. The device 82 is connected to the sequencer 4, by connections which are not shown, supplying control signals depending on the parity of these frames.

The computing device 7 comprises a multiplier 71, a subtracter 72, a frame parity correction device 73, and a device 74 for computing the closest integer value (VEPP) to a value. A first input of the multiplier 71 constitutes the input of the device 7 receiving the value of the components of the vector $\vec{V}(IX,IY,T_j)$. A second input of the multiplier 71 continuously receives the value $(T_i-T_j)$. An output of the multiplier 71 is connected to a first input of the subtracter 72 and supplies it with the value of the components of the vector $\vec{V}(T_i-T_j)$. A second input of the subtracter 12 receives the coordinates (IX,IY) supplied by the sequencer 4 and constituting the components of the vector $\vec{PC_j}$. An output of the subtracter 72 supplies to an input of the device 73 the value of the components of the vector $\vec{PE_j}$ computed according to the formula (4).

The device 73 adds to the value of these components the value of the components of the vector $\vec{Z_j}$ which depends on the parity of the frame $T_j$ and of the frame $T_i$. The device 73 can be constituted like the devices 62 and 82. It is connected to outputs of the sequencer 4 by connections which are not shown supplying it with control signals depending on the parity of the frames $T_j$ and $T_i$. An output of the device 73 is connected to an input of the device 74.

The device 74 adds 0.5 to each of the components of the vector supplied by the output of the device 73 and then takes the integer part of the sum obtained. The device 74 can be constituted from two adders each adding the constant value 0.5. The integer part is extracted by setting the bits constituting the fractional part to zero. An output of the device 74 constitutes the output of the device 7 and supplies the value of two components constituting the vector $\vec{PF_j}$. The value of these components is used in particular as an address value for the memories M1 and M2 during the writing into these memories of the value of the DFD function and of the components of the velocity vector, corresponding to the son pixel centered on the point $F_j$.

The computing devices 10 and 11 have a similar structure, but the device 10 is coupled to the memory MA while the device 11 is coupled to the memory MB. The device 10 comprises: a device 101 for computing the closest integer value to the value of the components of a vector, an adder 102, a subtracter 103, an address computation device 104, and a computing device 105 which implements the formula (8) and which will be described in greater detail with reference to FIG. 14.

An input of the device 101 constitutes the input of the device 10 and is also connected to a first input of the subtracter 103. An output of the device 101 is connected to a first input of the adder 102 and to an input of the address computation device 104 in order to supply them with the value of the components $(XG_a, YG_a)$ obtained by taking the integer part of the value of the components of the vector $\vec{PA}$. The device 101 can be constituted like the device 74.

The adder 102 has a second input continuously receiving the value of the components of a vector $(1,1)$, and has an output connected to a second input of the subtracter 103. An output of the subtracter 103 is connected to an input terminal 106 of the computing device 105 in order to supply it with the value of the coordinates relating to the point A: $(\Delta X_a, \Delta Y_a)$. The computing device 105 has a second input terminal 108 connected to a data output of the memory MA and has an output terminal 107 constituting the output of the device 10 and connected to the first input of the subtracter 14 in order to supply it with the luminance value $L(\vec{PA}, T_a)$.

The address computation device 104 has an input connected to the output of the device 101 in order to receive the coordinates $(XG_a, YG_a)$ and has an output connected to an address input of the memory MA. The device 1 04 supplies four successive addresses to the memory MA under the effect of a clock signal supplied by the sequencer 4 which commands four successive readings in the memory A in order to read the luminance values stored at addresses constituted by the coordinates: $(XG_a+1, YG_a+1)$; $(XG_a, YG_a+1)$; $(XG_a+1, YG_a)$; $(XG_a, YG_a$a. The device 103 can be constituted from four registers, four adders and a multiplexer, controlled by control signals supplied by the sequencer 4.

The computing device 11 comprises: a device 111 for computing the closest integer value to the components of a vector, an address computation device 112, an adder 113, a subtracter 114 and a computing device 115, having functions similar to the functions of the elements 101 to 105 of the computing device 10.

Figure 14:
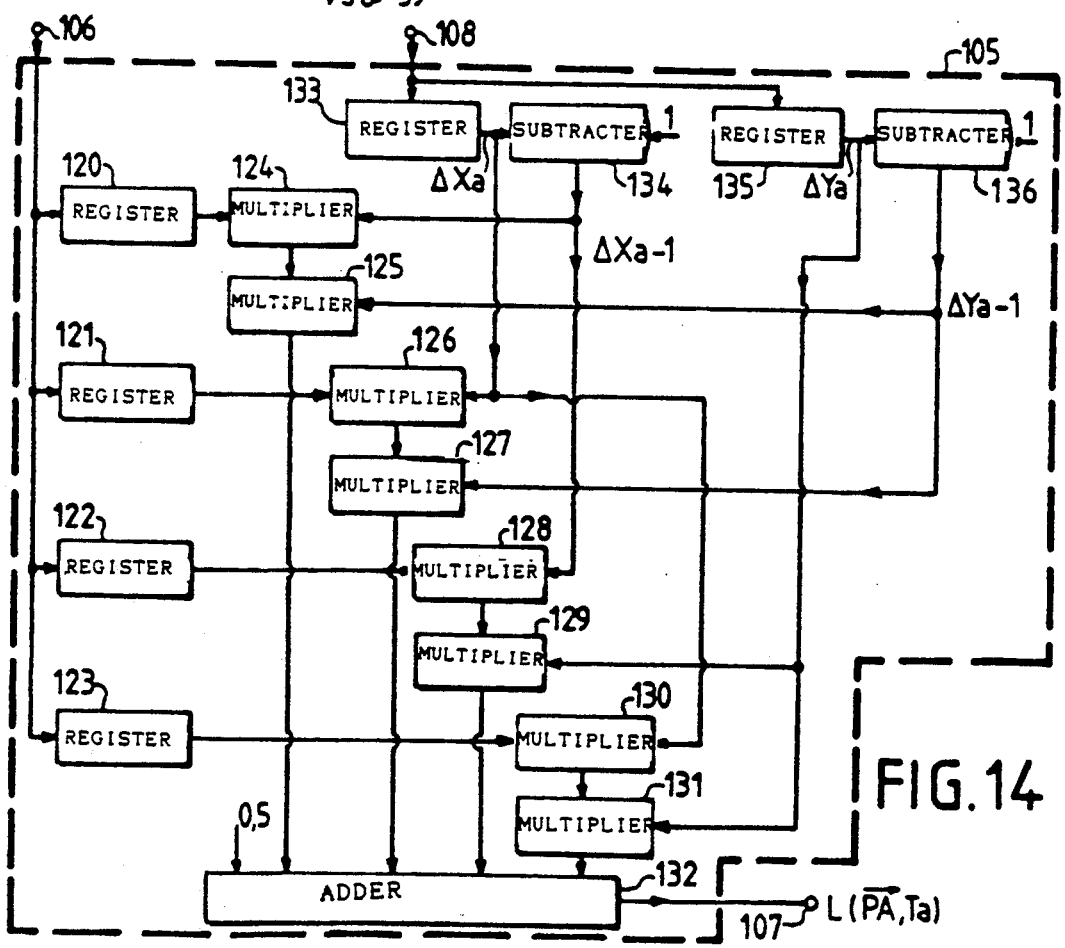

FIG. 14 shows the block diagram of an embodiment of the computing device 105. It comprises: six registers; 120 to 123 and 133, 135; eight multipliers, 124 to 131; an adder 132 and two subtracters 134 and 136. The device 105 implements the formula (8). The input terminal 106 is connected to inputs of the registers 120 to 123 which respectively store the four pairs of coordinates applied to the input terminal 106. The input terminal 108 is connected to inputs of the registers 133 and 135 which respectively store the values $\Delta X_a$ and $\Delta Y_a$. The outputs of the registers 120 to 123 are respectively connected to first inputs of the multipliers 124, 126, 128 and 130. The output of the register 133 is connected to: a first input of the subtracter 134, a second input of the multiplier 126 and a second input of the multiplier 130. The output of the multipliers 124, 126, 128 and 130 is respectively connected to a first input of the multiplier 125, the multiplier 127, the multiplier 129 and the multiplier 131. The output of the register 135 is connected to a second input of the multiplier 129, to a second input of the multiplier 131, and to a first input of the subtracter 136. The subtracter 134 has a second input continuously receiving the value 1 and has an output connected to a second input of the multiplier 124 and to a second input of the multiplier 128. The subtracter 136 has a second input continuously receiving the value 1 and has an output connected to a second input of the multiplier 125 and to a second input of the multiplier 127. The outputs of the multipliers 125, 127, 129 and 131 are respectively connected to four inputs of the adder 132. A fifth input of the adder 132 continuously receives the value 0.5. An output of the adder 132 is connected to the output terminal 107.

The subtracters 134 and 136 respectively supply the values $\Delta X_a - 1$ and $\Delta Y_a - 1$. The multipliers 124 and 125 compute the first term of the formula (8). The multipliers 126 and 127 compute the second term. The multipliers 128 and 129 compute the third term. The multipliers 130 and 131 compute the fourth term. The adder 132 supplies the sum of these four terms and of the constant term 0.5.

Figure 15:
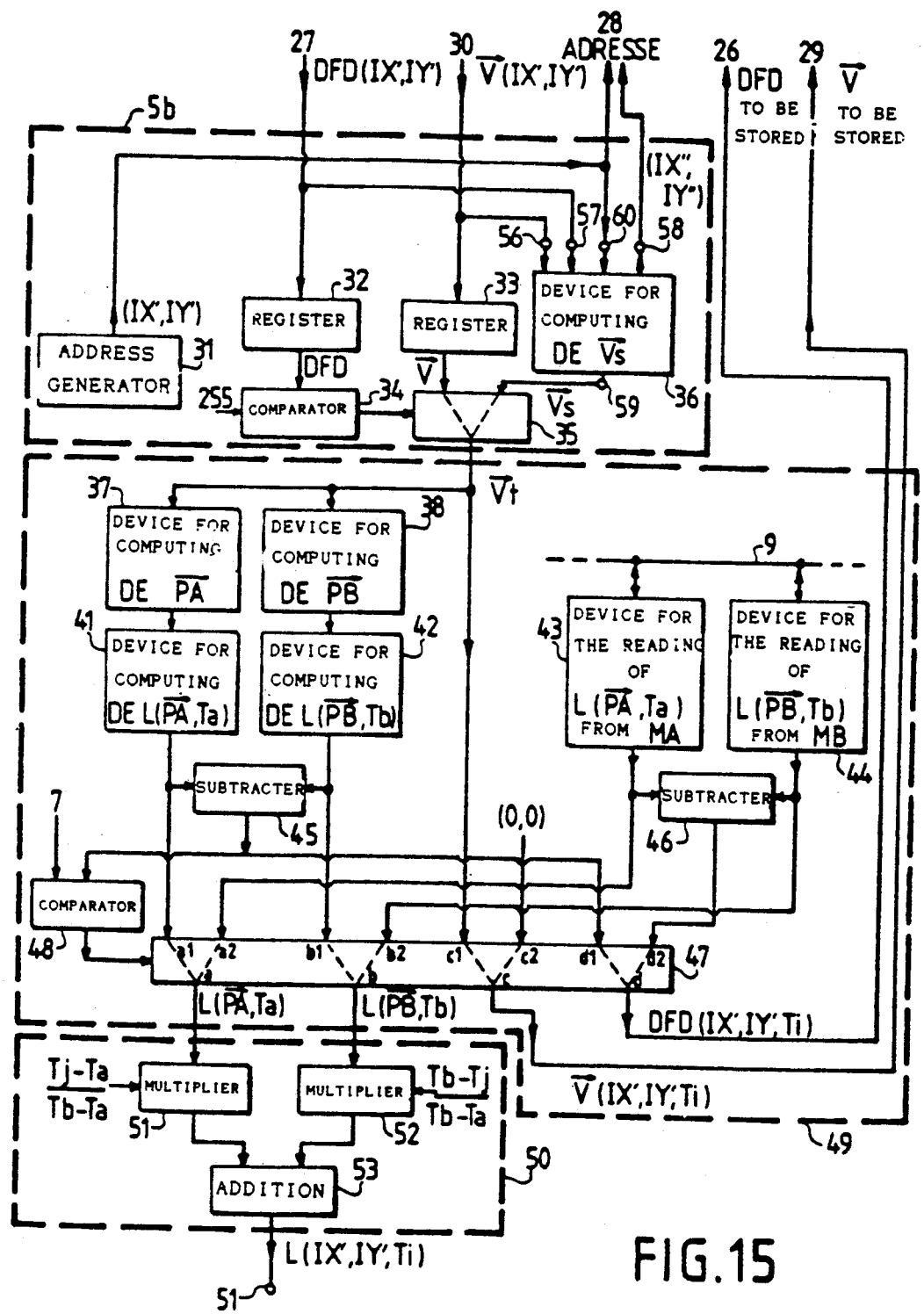

FIG. 15 shows the block diagram of the second section of the embodiment of a device for the implementation of the first variant of the method according to the invention. This second section corresponds to the second phase of the method. It comprises in particular means of computation $5b$ for determining an interpolated velocity vector from velocity vectors of pixels adjacent to the pixel to be interpolated when the latter does not have any father pixels or when its father pixels have not been validated.

It furthermore comprises: means of computation 49 for associating a zero velocity vector with the pixel to be interpolated when the interpolated velocity vector is not validated, and for determining the luminance values $L(\vec{PA}, T_a)$ and $L(\vec{PB}, T_b)$ of the two base points A and B as a function of the velocity vector associated with the pixel to be interpolated; and means of computation 50 to compute an interpolated luminance value, as a function of the luminance values of the two base points.

The means of computation $5b$ comprise: an address generator 31; two registers, 32 and 33; a comparator 34; a multiplexer 35 having two inputs and one output; and a computing device 36 for computing an interpolated velocity vector $\vec{V}_s$.

An output of the address generator 31 and an output terminal 58 of the computing device 36 are connected to the input terminal 28 of the means of computation $5a$, which is connected to the address inputs of the memories M1 and M2. The address generator 31 supplies a series of addresses constituted by the coordinates (IX', IY') corresponding to a systematic scanning of all the pixels to be interpolated of the frame $T_j$. Each of these addresses enables the reading of a value DFD(IX',IY') of the DFD function from the memory M2 and a velocity vector $\vec{V}$(IX',IY') from the memory M1, corresponding to a pixel to be interpolated. A data input of the register 32 and an input terminal 57 of the computing device 36 are connected to the output terminal 27 of the means of computation $5a$, which receives the value DFD(IX',IY') read from the memory M2. A data input of the register 33 and an input terminal 56 of the computing device 36 are connected to the output terminal 30 of the means of computation $5a$, which supplies the value of the components of the velocity vector $\vec{V}$(IX',IY') read from the memory M1.

The value DFD(IX',IY') stored in the register 32 is compared with a threshold value, 255, by the comparator 34. An output of the comparator 34 is connected to a control input of the multiplexer 35. An output of the register 33 is connected to a first input of the multiplexer 35. An output terminal 59 of the computing device 36 supplies the value of the components of an interpolated velocity vector $\vec{V}_s$ to a second input of the multiplexer 35. An output of the multiplexer 35 constitutes an output of the means 5b and is connected to a first input of the means of computation 49 in order to supply a velocity vector $\vec{V}_t$.

When the value of the DFD function supplied by the register 32 is less than the threshold value 255, the comparator 34 controls the multiplexer 35 so that it transmits the value of the components of the vector $\vec{V}$ stored in the register 33, since this velocity vector is suitable. When the value of the DFD function is equal to 255, this signifies that the pixel to be interpolated has no father pixel and consequently it is necessary to determine a velocity vector by an interpolation from the velocity vectors of adjacent pixels. The comparator 34 then controls the multiplexer 35 such that it transmits the value of the components of the interpolated velocity vector $\vec{V}_s$ supplied by the computing device 36.

Figure 16:
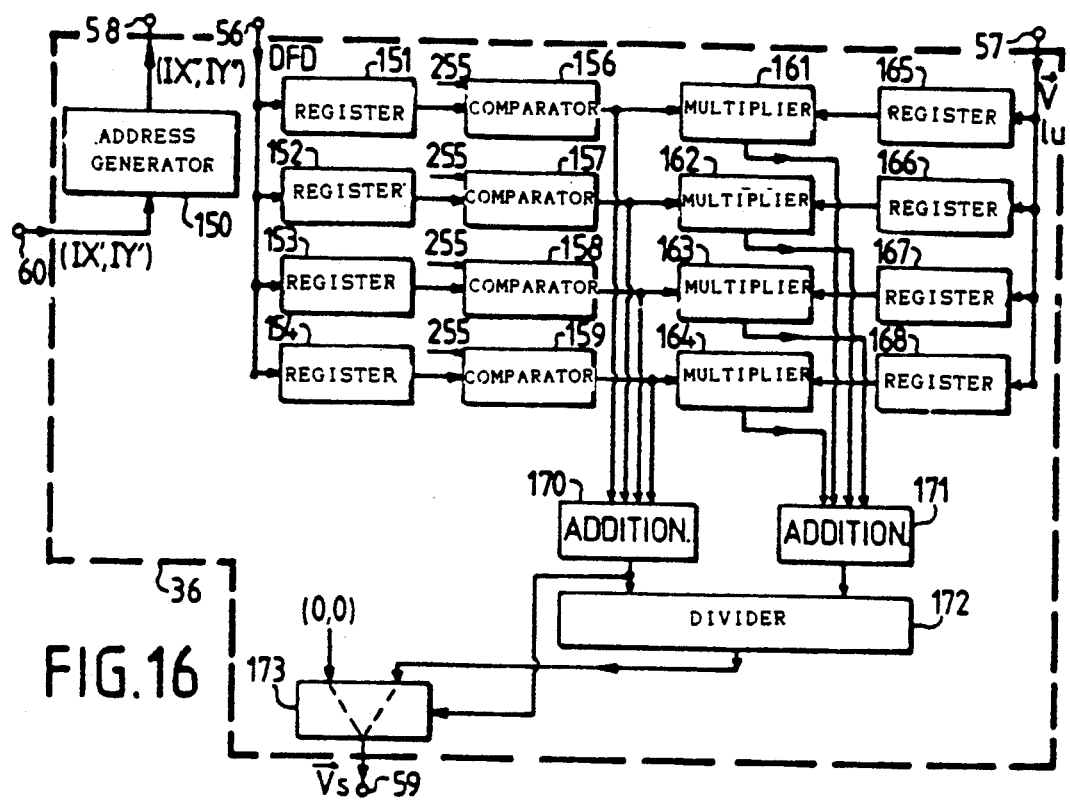

A block diagram of the computing device 36 is shown in FIG. 16. It comprises: an address generator 150; ten registers 151 to 154 and 165 to 168; five comparators 156 to 159; four multipliers, 161 to 164; two adders 170 and 171; a divider 172; and a multiplexer 173 having two inputs and one output.

The address generator 150 has an input connected to the input terminal 60 in order to receive the series of coordinates (IX',IY') of each pixel of the frame to be interpolated $T_j$, and it has an output connected to the output terminal 58 in order to successively supply four values of coordinates (IX",IY") for each pixel to be interpolated. Each pair of coordinates (IX",IY") corresponding to a pixel adjacent to the pixel to be interpolated, in the same column or in the same line of the frame, and constitutes a read address for reading from the memory M1 the velocity vectors associated with these adjacent pixels, if they have an associated velocity vector, and in order to read from the memory M2 the values of the DFD function corresponding to these adjacent pixels and enabling it to be known if they have or do not have a father pixel.

The registers 151 to 154 each have a data input connected to the input terminal 56 in order to receive and store the values of the DFD function read from the memory M2 and corresponding to the four adjacent points respectively. The registers 165 to 168 each have a data input connected to the input terminal 57 in order to receive the value of the components of the velocity vectors read from the memory M1 and respectively corresponding to the four adjacent points. The registers 151 to 154 have outputs respectively connected to first inputs of the comparators 156 to 159. The comparators 156 to 159 have second inputs receiving a constant value equal to 255 and have outputs respectively connected to first inputs of the multipliers 161 to 164 and respectively to four inputs of the adder 170. The comparators 156 to 159 each supply a logic signal of value 1 when the value applied to their first input is less than 255 and a zero value when the value applied to their first input is equal to 255. The values of these logic signals are added by the adder 170. The output of the adder 170 is connected to a first input of the divider 172 and to a control input of the multiplexer 173.

The outputs of the registers 165 to 168 are respectively connected to second inputs of the multipliers 161 to 164. The multipliers 161 to 164 multiply the values of the components of the velocity vectors by the values of the logic signals respectively supplied by the comparators 156 to 159, and supply the result on outputs respectively connected to four inputs of the adder 171. The output of the adder 171 is connected to a second input of the divider 172. An output of the divider 172 supplies the value of the components of a velocity vector interpolated according to the formula (10). An output of the multiplexer 173 is connected to the output terminal 59 of the computing device 36.

When the sum computed by the adder 170 is not zero, the value which it supplies on its output controls the multiplexer 173 such that it transmits the value of the components of the interpolated vector. If the value of the sum computed by the adder 170 is equal to 0, i.e. if the four adjacent pixels have no validated father pixels, the value 0 applied to the control input of the multiplexer 173 commands the transmission of a zero vector in order to constitute the vector $\vec{V}_s$ supplied by the computing device 36.

The means of computation 49, of the second section of the embodiment whose block diagram is shown in FIG. 15, comprise two halves computing in parallel the luminance values of the base points A and B and the value of the DFD function respectively for the velocity vector $\vec{V}_t$ supplied by the means of computation 5b and for a zero velocity vector. These two computations in parallel enable time to be saved when it finally arises that the velocity vector supplied by the means of computation 5b is not validated because the corresponding DFD has a value greater than the threshold 7.

These means of computation 49 comprise: a computing device 37 to compute the vector $\vec{PA}$ for the velocity vector $\vec{V}_t$; a computing device 38 for computing a vector $\vec{PB}$ for the velocity vector $\vec{V}_t$; a computing device 41 for computing a luminance vector $L(\vec{PA},T_a)$ for the velocity vector $\vec{V}_t$; a computing device 42 for computing a luminance value $L(\vec{PB},T_b)$ for the velocity vector $\vec{V}_t$; a device 43 for reading $L(\vec{PA},T_a)$ at the address (IX',IY') in the memory MA and a device 44 for reading $L(\vec{PB},T_b)$ at the address (IX',IY') in the memory MB, which corresponds to a zero velocity vector; a subtracter 45 and a subtracter 46 for respectively determining the value of the DFD function for the velocity vector $\vec{V}_t$ and for a zero velocity vector; a comparator 48; and a multiplexer 47 having eight inputs and four outputs.

The computing device 37 is similar to the previously described computing device 6 shown in FIG. 13. The computing device 38 is similar to the previously described computing device 8 shown in FIG. 13. The computing devices 41 and 42 are similar to the previously described computing devices 10 and 11 respectively shown in FIG. 13. The reading devices 43 and 44 each have an input-output connected to the bus 9. They have a very simple structure constituted of buffer registers controlled by signals supplied by the sequencer 4, and routed over connections which are not shown.

The computing devices 37 and 38 each have their input which is connected to the first input of the means of computation 49 in order to receive the value of the components of the vector $\vec{V}_t$. The outputs of the computing devices 37 and 38 are respectively connected to the inputs of the computing devices 41 and 42. The output of the device 41 is connected to a first input of the subtracter 45 and to an input referenced a1 of the multiplexer 47. The output of the device 42 is connected to a second input of the subtracter 45 and to an input referenced b1 of the multiplexer 47. The output of the device 43 is connected to a first input of the subtracter 46 and to an input referenced a2 of the multiplexer 47. The output of the device 44 is connected to a second input of the subtracter 46 and to an input referenced b2 of the multiplexer 47.

The output of the subtracter 45 is connected to a first input of the comparator 48 and to an input referenced d1 of the multiplexer 47. The output of the subtracter 46 is connected to an input referenced d2 of the multiplexer 47. The multiplexer 47 also has: an input referenced c1 connected to the first input of the means of computation 49 in order to receive the vector $\vec{V}_t$, an input referenced c2 which receives a zero velocity vector; four outputs referenced a, b, c and d respectively constituting a first, a second, a third and a fourth output of the means of computation 49; and a control input connected to the output of the comparator 48.

The subtracter 45 computes the value of the DFD function for the pixel to be interpolated, with the vector $\vec{V}_t$ as the associated velocity vector. The value of the DFD function is compared with the threshold value 7, by the comparator 48. If the value of the DFD function is less than or equal to 7, the multiplexer 47 transmits the data applied to the inputs a1, b1, c1 and d1 respectively to the outputs a, b, c and d. If the value of the DFD function corresponding to the vector $\vec{V}_t$ is greater than the threshold value, 7, the multiplexer 47 is controlled such that it transmits the data present on the inputs a2, b2, c2 and d2 respectively to the outputs a, b, c and d.

Thus the first and the second outputs of the means of computation 49 respectively supply a luminance value $L(\vec{PA},T_a)$, $L(\vec{PB},T_b)$, corresponding to the velocity vector selected for association with the pixel to be interpolated; the second and the third outputs of the means of computation 49 respectively supply the velocity vector which is used for constituting the vector $\vec{V}(IX',IY',T_i)$ associated with the pixel to be interpolated, and the value of the DFD function corresponding to this pixel to be interpolated $(IX',IY',T_i)$.

The third and fourth outputs of the means of computation 49 are respectively connected to the input terminals 26 and 29 of the means of computation 5a for the writing of the associated velocity vector and of the value of the DFD function into the memories M1 and M2 at the address constituted by the coordinates (IX',IY'). This velocity vector and this value of the DFD function will thus be available subsequently for the computation of inter-polated velocity vectors for orphan pixels.

The means of computation 50 have two inputs respectively connected to the first and to the second output of the means of computation 49 in order to receive the two luminance values of the base points A and B corresponding to the pixel to be interpolated. The means of computation 50 comprise two multipliers 51 and 52 and an adder 53. The multiplier 51 has: a first input connected to the first output of the means 49; a second input receiving a constant value equal to $(T_j-T_a)/(T_b-T_a)$; and an output connected to a first input of the adder 53. The multiplier 52 has: a first input connected to the second output of the means 49; a second input receiving a constant value equal to $(T_b-T_j)/(T_b-T_a)$, and an output connected to a second input of the adder 53. The adder 53 has an output connected to the output terminal 51 of the temporal interpolation device in order to supply it with an interpolated luminance value $L(IX',IY',T_i)$ corresponding to the pixel to be interpolated, having coordinates $(IX',IY',T_i)$, and computed according to the formula (9). These luminance values can be used in real time, as they are computed, or they can be stored in a frame memory which is not shown.

The invention is not limited to the embodiments described above and numerous variants are within the scope of those skilled in the art. In particular it is within the scope of those skilled in the art to modify the previously described embodiment in order to implement the previously described second and third variants of the method.

In particular the invention is applicable in real time to standard changing devices for television frames, and to the restitution of frames transmitted at a very low rate with suppression of a certain number of frames.

I claim:

1. A method for determining an interpolated luminance value for each pixel of an image to be interpolated at an instant $T_j$, comprising the steps of:

obtaining luminance values of pixels of a first known image and of a second known image at instants $T_a$ and $T_b$ respectively, the instant $T_j$ being between $T_a$ and $T_b$, determining components of a velocity vector for each father pixel of a motion carrier image which occurs at an instant $T_i$ between $T_a$ and $T_b$ or equal to one of $T_a$ and $T_b$;

determining successively for each father pixel of the motion carrier image, coordinates of the center of a son pixel to be interpolated, by processing the center of the father pixel using a vector translation which is a function of the velocity vector of the father pixel, multiplied by a duration $T_i-T_j$;

associating a velocity vector with each said son pixel to be interpolated, said velocity vector for said each pixel constituted by the velocity vector or a father pixel of said each pixel;

determining in the two images, coordinates of two base points of the temporal interpolation, each of said two base points corresponding to the center of the pixel to be interpolated, by a translation in the plane of one of the known images, the vector of said translation in the plane of the known images being a function of the velocity vector associated with the pixel to be interpolated, respectively multiplied by the durations $T_j-T_a$ and $T_b-T_j$;

determining a luminance value of each of the two base points by means of a spatial interpolation between the pixels adjacent to each of these base points, respectively in the two known images;

determining an interpolated luminance value for the pixel to be interpolated by computing a linear combination of the two luminance values of the base points and weighting said linear combination by the durations $T_j-T_a$ and $T_b-T_j$ respectively and supplying the interpolated luminance value as luminance information for the instant $T_i$.

2. The method as claimed in claim 1, comprising the further steps of, in order to determine the coordinates of the center of a son pixel corresponding with a given father pixel:

determining the coordinates of a point of the image to be interpolated corresponding with the center of the father pixel by a vector translation which is equal to the velocity vector of the father pixel multiplied by the duration $T_i-T_j$;

then in determining the pixel or the image to be interpolated whose center is the closest to the point thus determined, this pixel then constituting the son pixel of the give father pixel.

3. The method as claimed in claim 1, applied to images constituted by television image frames, comprising the further steps of, in order to determine the coordinates of the center of a son pixel corresponding with the center of a given father pixel:
  determining the coordinates of a point of the frame to be interpolated corresponding with the center of the father pixel by a vector translation which is equal to the velocity vector of the father pixel multiplied by the duration $T_i - T_j$, while shifting one of the coordinates of the point of the image to be interpolated corresponding with the center of the father pixel by a value from the group consisting of 0, $-0.5$ or $+0.5$ pixel, depending on a parity of the frame constituting the image to be interpolated and on the parity of the frame constituting the motion carrier image;
  then in determining the pixel of the image to be interpolated whose center is the closest to the point thus determined, this pixel then constituting the son pixel of the given father pixel;
  and wherein in order to determine in the two known images the coordinates of the two base points, it furthermore consists in shifting one of the coordinates of these two points (A,B) by 0 or $-0.5$ or $+0.5$ pixel, depending on the parities of the two frames constituting the two known images, and on the parity of the frame constituting the image to be interpolated.

4. The method as claimed in claim 1, wherein for each pixel to be interpolated having at least one father pixel, it comprises the further steps of validating the velocity vector of the father pixel, in computing the value, called criterion function of the pixel to be interpolated, of the difference between the luminances of the two base points of the temporal interpolation; and in verifying that the criterion function is less than a fixed threshold value; and wherein, if the velocity vector of any father pixel is not validated, or if the pixel to be interpolated has no father pixel,
  associating with the pixel to be interpolated a velocity vector interpolated as a function of the velocity vectors associated with the pixels adjacent to the pixel to the pixel to be interpolated, computed for the interpolated velocity vector, is less than a fixed threshold value;
  otherwise, in associating a zero velocity vector with the pixel to be interpolated.

5. The method as claimed in claim 4, wherein, when a pixel to be interpolated has several father pixels, the velocity vector associated with said pixel to be interpolated is constituted by the velocity vector of the father pixel such that the criterion function of the pixel to be interpolated is minimized.

6. The method as claimed in claim 1, wherein, when a pixel to be interpolated has several father pixels, the velocity vector associated with said pixel to be interpolated is constituted by the velocity vector of a most recently determined father pixel.

7. The method as claimed in claim 1, comprising the further steps of, for each pixel to be interpolated and not having a father pixel, in associating with said pixel to be interpolated a velocity vector interpolated as a function of the velocity vectors associated with the pixels adjacent to the pixel to be interpolated, if there are adjacent pixels having associated velocity vectors, otherwise in associating with said pixel to be interpolated a zero velocity vector.

8. The method as claimed in claim 1, comprising the further steps of, for each pixel to be interpolated and not having a father pixel, associating a zero velocity vector with said each pixel to be interpolated.

9. A device for temporal interpolation of images, comprising:
  means for receiving a series of luminance values respectively representing pixels of a first known image taken at an instant $T_a$ and pixels of a second known image taken at an instant $T_b$;
  a first and a second memory for respectively storing said luminance values of the first known image and of the second known image;
  processing means for obtaining a series of values respectively representing components of the velocity vector of father pixels of a third image, called a motion carrier image, corresponding to an instant $T_i$ between $T_a$ and $T_b$ or equal to one of $T_a$ or $T_b$;
  first means for computing, for each father pixel of the carrier image, coordinates of a center of a son pixel, located in the image to be interpolated and having a center which corresponds with the center of the father pixel by a vector translation which is a function of the velocity vector of the father pixel, multiplied by the duration $T_i - T_j$;
  second means for associating with each said son pixel to be interpolated, a velocity vector which is the velocity vector of a father pixel of said pixel to be interpolated;
  third means for computing coordinates, in the two known images respectively, of two points called base points of the temporal interpolation, each of said two points corresponding to the center of the pixel to be interpolated by a vector translation which is a function of the velocity vector associated with the pixel to be interpolated, respectively multiplied by the durations $T_j - T_a$ and $T_b - T_j$;
  fourth means for computing luminance values of the two base points, and for linearly combining two luminance values of the two base points, weighted by the durations $T_j - T_a$ and $T_b - T_j$ respectively to produce an interpolated luminance value; and
  means for supplying a series of interpolated luminance values representing luminance of the pixels of an image to be interpolated corresponding to an instant $T_j$ between $T_a$ and $T_b$.

10. The device as claimed in claim 9, wherein the first means of computation comprise:
  a multiplier for computing a vector by multiplying the velocity vector of the father pixel by the duration $T_i - T_j$;
  a subtracter for subtracting, from the vector computed by the multiplier, a vector having as components the coordinates of the center of the father pixel;
  a device for computing the nearest integer value of each of the components of the vector computed by the subtracter; each constituting a coordinates of the center of the son pixel.

11. The device as claimed in claim 10, further comprising a frame parity correction device, for adding a correction vector to the vector computed by the subtracter, inserted between the subtracter and the device for computing the nearest integer value of each component; the correction device being controlled as a function of a parity of the frames corresponding to the instants $T_i$ and $T_j$.

12. The device as claimed in claim 9, wherein the second means of computation comprise:

two first computing devices for computing the coordinates, in the two known images respectively, of two points called base points of the temporal interpolation, from the coordinates of the pixel to be interpolated, by a translation depending on the velocity vector of a father pixel of the pixel to be interpolated, if there is at least one father pixel, and depending on the durations $T_j-T_a$ and $T_b-T_j$ respectively;

two second computing devices for computing the luminance values of the two base points by a spatial interpolation in the two known images respectively;

a subtracter for computing the absolute value, called the criterion function of the pixel to be interpolated, of the difference between the two luminance values computed by the second computing devices;

a first comparator for comparing the criterion function value with a predetermined threshold value, and validating the velocity vector of the considered father pixel if the criterion function value is less than the threshold value;

a first memory for storing an associated velocity vector for each pixel to be interpolated; and means of computation for associating with a pixel to be interpolated, a velocity vector interpolated from velocity vector associated with adjacent pixels, and read from the first memory, when the pixel to be interpolated does not have a father pixel whose velocity vector is validated.

13. The device is claimed in claim 12, wherein the second means of computation further comprises:

a second memory for storing the criterion function value for each pixel to be interpolated;

a second comparator for comparing each criterion function value computed for a pixel to be interpolated, with a criterion function value previously stored for the same pixel to be interpolated;

means of writing into the first memory the velocity vector of a father pixel of a pixel to be interpolated, if the criterion function value computed for this velocity vector is less than that stored in the second memory at the address corresponding with this pixel to be interpolated; and means for writing into the second memory the criterion function value computed for this velocity vector, at the address corresponding to the pixel to be interpolated.

* * * * *